United States Patent
Sun

(10) Patent No.: US 9,285,543 B2
(45) Date of Patent: Mar. 15, 2016

(54) FIBER OPTIC CONNECTORS, CABLE ASSEMBLIES, AND METHOD FOR MAKING THE SAME

(71) Applicant: CORNING CABLE SYSTEMS (SHANGHAI) CO., LTD, Hickory, NC (US)

(72) Inventor: JiWei Sun, Shanghai (CN)

(73) Assignee: Corning Cable Systems (Shanghai) Co., Ltd, Hickory, NC (US)

( * ) Notice: Subject to any disclaimer, the term of this patent is extended or adjusted under 35 U.S.C. 154(b) by 0 days.

(21) Appl. No.: 14/134,228

(22) Filed: Dec. 19, 2013

(65) Prior Publication Data

US 2014/0105552 A1    Apr. 17, 2014

Related U.S. Application Data

(63) Continuation of application No. PCT/CN2011/001082, filed on Jun. 30, 2011.

(51) Int. Cl.
*G02B 6/255* (2006.01)
*G02B 6/38* (2006.01)

(52) U.S. Cl.
CPC .............. *G02B 6/2555* (2013.01); *G02B 6/255* (2013.01); *G02B 6/3846* (2013.01); *G02B 6/3887* (2013.01); *G02B 6/3801* (2013.01); *Y10T 29/49947* (2015.01)

(58) Field of Classification Search
CPC .. G02B 6/2551; G02B 6/2553; G02B 6/3616; G02B 6/3636; G02B 6/3801

USPC .......................... 385/97, 95, 77–87; 29/525.01
See application file for complete search history.

(56) References Cited

U.S. PATENT DOCUMENTS

| | | | |
|---|---|---|---|
| 7,104,702 B2 | 9/2006 | Barnes et al. | 385/77 |
| 7,178,990 B2 * | 2/2007 | Caveney et al. | 385/87 |
| 7,204,644 B2 * | 4/2007 | Barnes et al. | 385/77 |
| 8,459,880 B2 * | 6/2013 | Castonguay et al. | 385/78 |
| 8,573,859 B2 * | 11/2013 | Larson et al. | 385/86 |
| 8,876,405 B2 * | 11/2014 | Larson et al. | 385/81 |
| 2007/0127872 A1 | 6/2007 | Caveney et al. | 385/78 |
| 2007/0147741 A1 | 6/2007 | Meek et al. | 385/55 |
| 2007/0217745 A1 | 9/2007 | Semmler et al. | |
| 2009/0087151 A1 | 4/2009 | Benjamin et al. | 385/98 |
| 2011/0044588 A1 * | 2/2011 | Larson et al. | 385/81 |
| 2012/0121222 A1 * | 5/2012 | Castonguay et al. | 385/78 |

FOREIGN PATENT DOCUMENTS

| | | | |
|---|---|---|---|
| CN | 101833145 | 9/2010 | G02B 6/38 |
| CN | 201681178 | 12/2010 | G02B 6/38 |
| WO | WO 2011/014148 A1 | 2/2011 | G02B 6/38 |
| WO | 2013003295 A2 | 1/2013 | |

OTHER PUBLICATIONS

European Search Report, Application No. 11868580.9-1504/2726923, Mar. 12, 2015, 7 pages.

* cited by examiner

*Primary Examiner* — Ellen Kim

(57) ABSTRACT

A fiber optic connector has a mechanical splice assembly and a mechanical splice assembly holder. The mechanical splice assembly holder includes a body section and a cable retention section. The cable retention section includes a pair of cable retention arms extending from the body section and a guiding groove that is extended out from the body section. The guiding groove is located between the two cable retention arms.

29 Claims, 21 Drawing Sheets

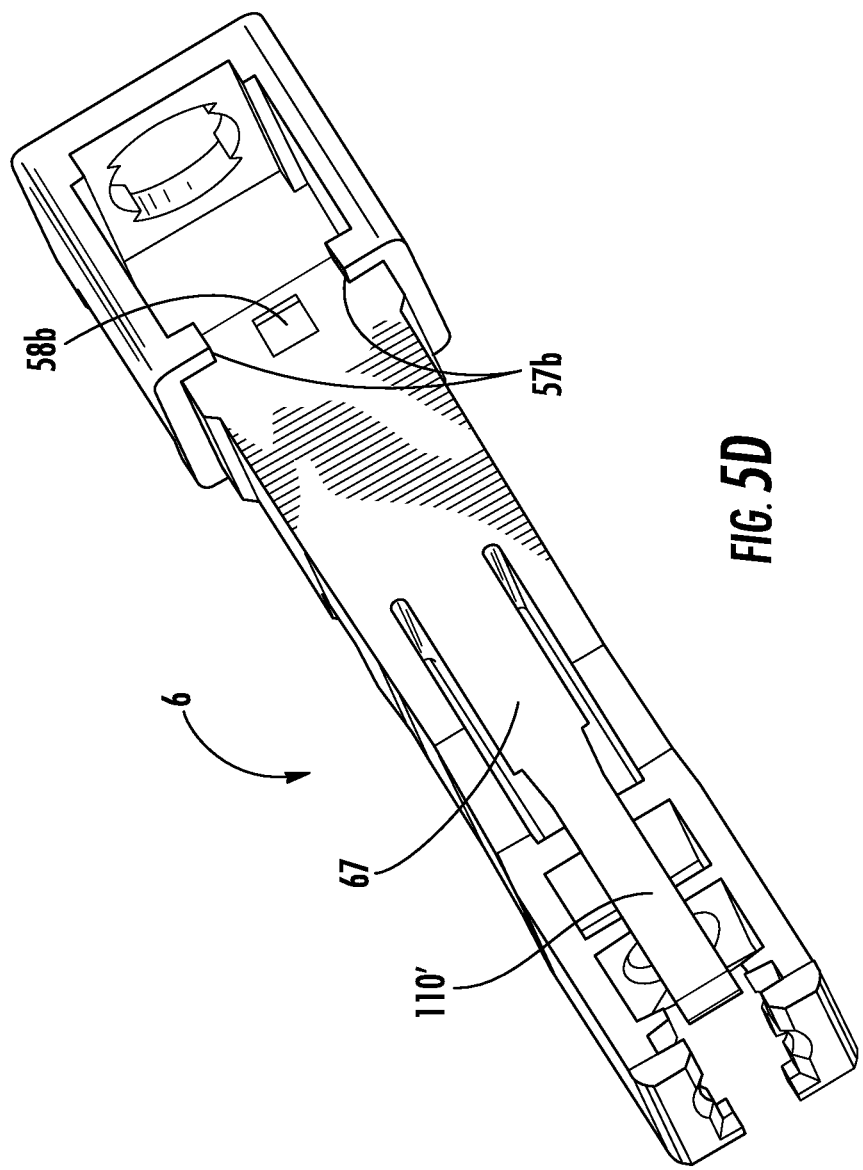

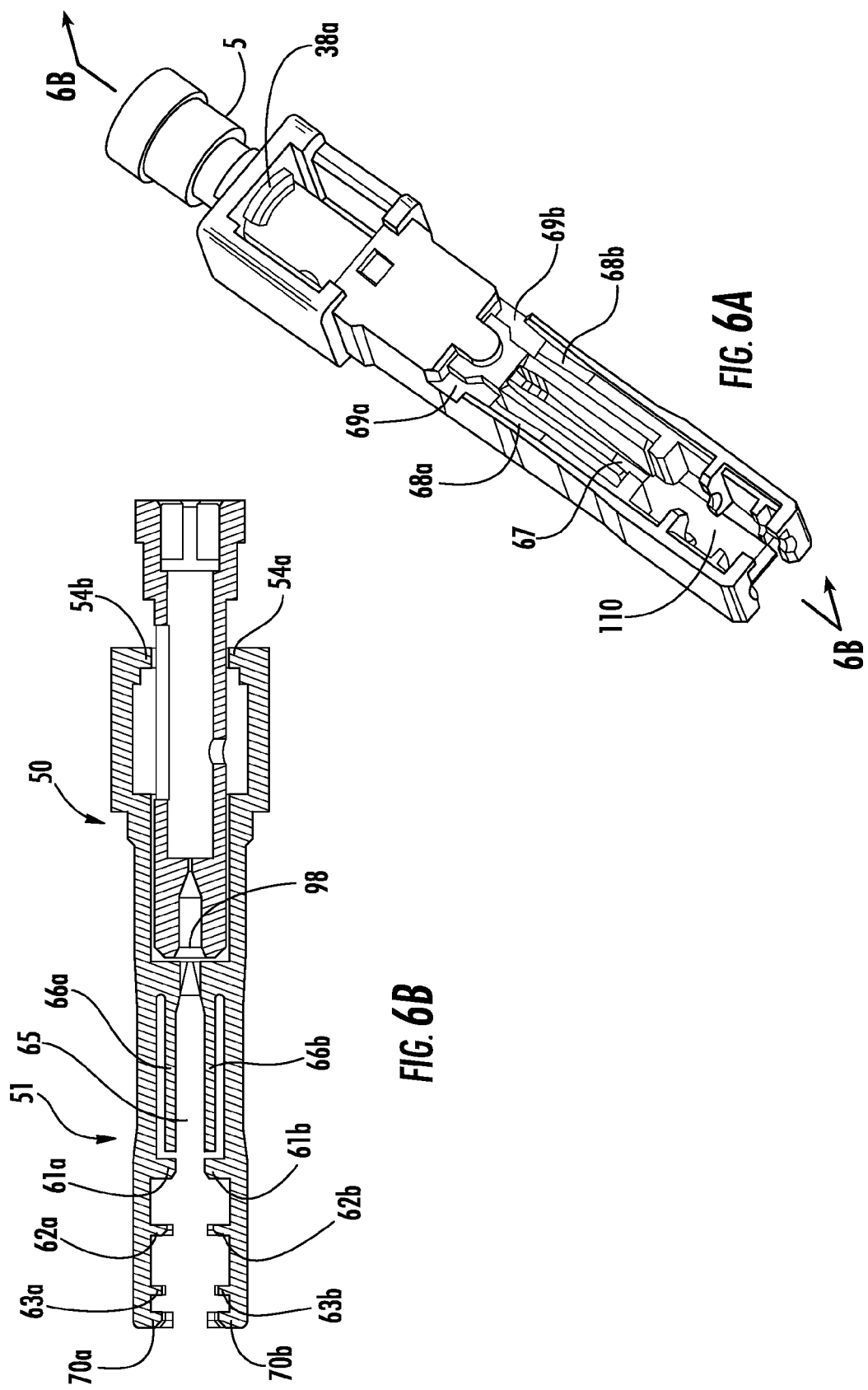

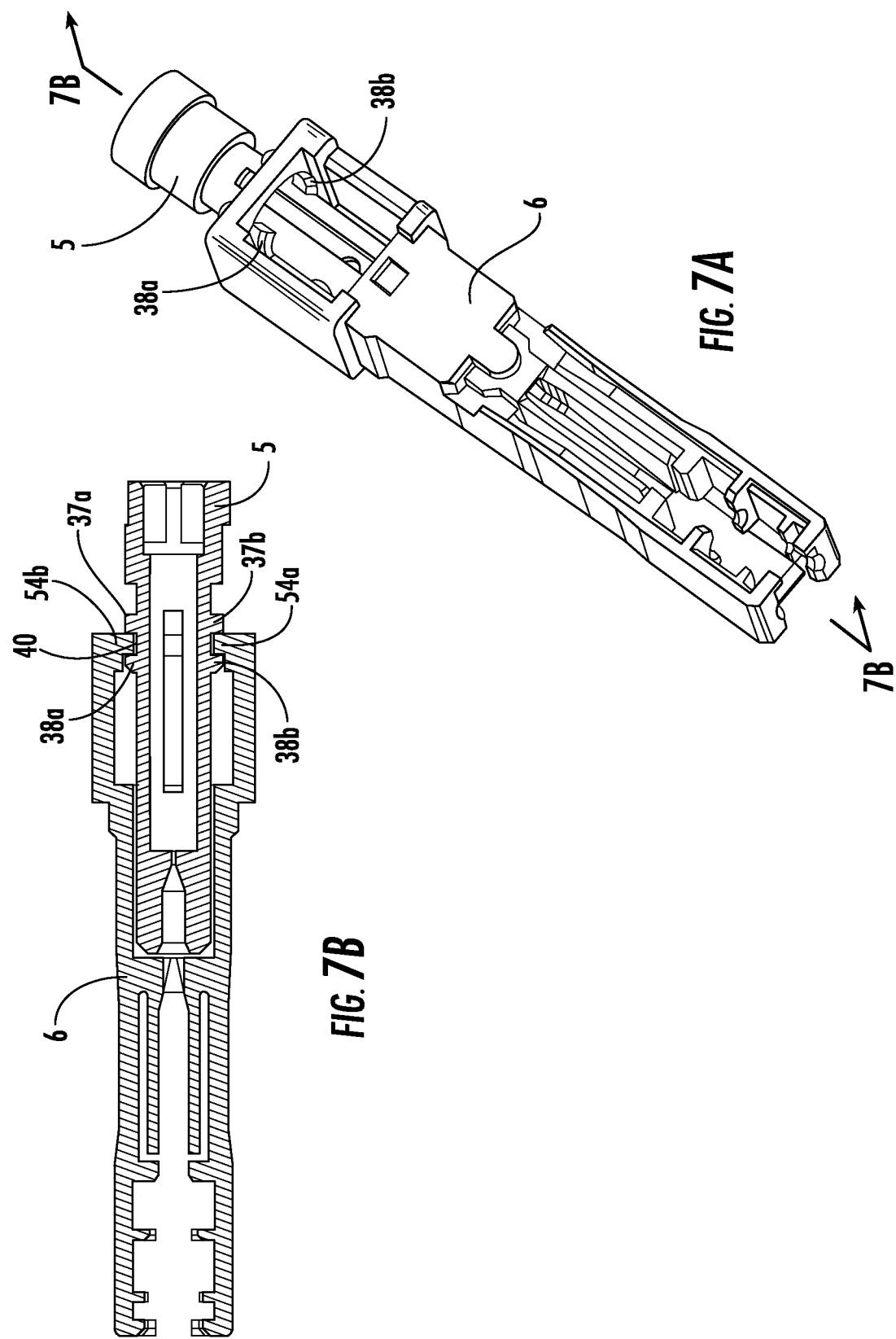

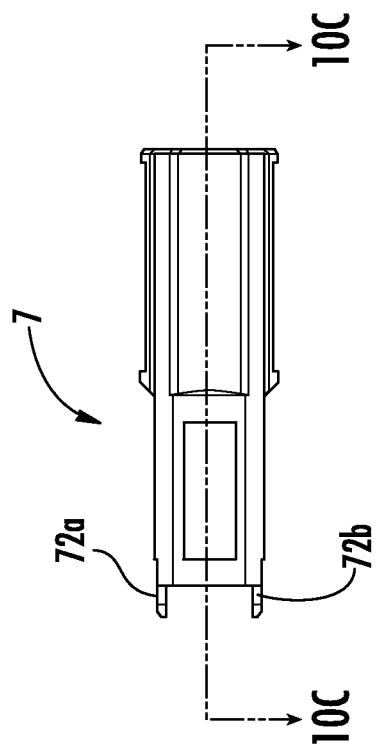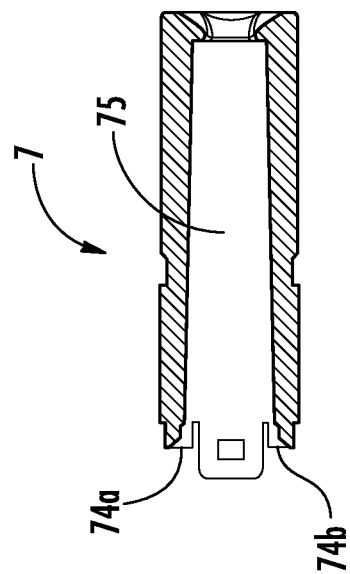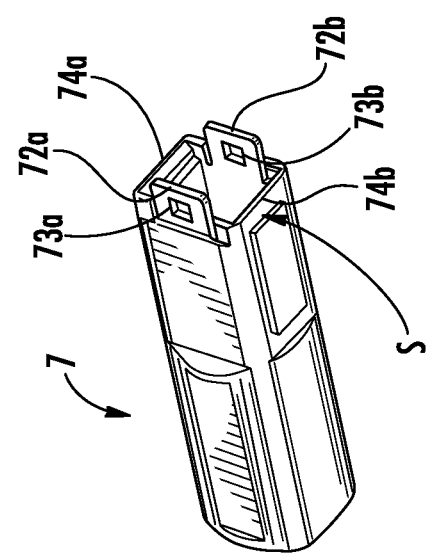

FIBER OPTIC CONNECTORS, CABLE ASSEMBLIES, AND METHOD FOR MAKING THE SAME

CROSS-REFERENCE TO RELATED APPLICATIONS

This application is a continuation of International Application No. PCT/CN2011/001082, filed on Jun. 30, 2011, the content of which is relied upon and incorporated herein by reference in its entirety.

BACKGROUND

The present disclosure relates generally to fiber optic connectors, cables assemblies, and methods for making the same. Specifically, the disclosure is directed to fiber optic connectors, cable assemblies, and methods that attach fiber optic cables to connectors.

Fiber optic communication networks are being widely used to transmit signals for voice, video, data and the like. As known to a person in the field, fiber optic cables are major carriers for signals in the fiber optic communication networks. Fiber optic cables require joining because they are manufactured in pre-determined lengths and the fiber optic communication networks require branching. A fiber optic connector is often used to join the ends of two fiber optic cables to facilitate changes in configurations of fiber optic cable route. In addition, the optical fibers in a cable must be terminated when it reaches the active transaction equipment to which the cable is coupled. To terminate a fiber optic cable, a fiber optic connector is also used as an interface between the fiber optic cable and the active transaction equipment.

With fast development of fiber optic communication networks, more fiber optic connectors are required to route fiber optic cables to end users in installing fiber optic communication networks. While the existing mechanical splice connectors can meet the needs in field installation, they have some shortcomings illustratively as follows. First, in the existing mechanical splice connectors, some of the components are attached one with another by using adhesives. Such a process is not easy to operate and time consuming in installation. Also, the structure in the existing fiber optic connectors is not suitable for deactivating and re-activating the fiber optic connectors for field installation because it is inconvenient and time consuming to deactivate and re-activate the existing fiber optic connectors without damaging the components and fiber optic cables. In addition, it is not convenient and takes high skills to perform field installation for the existing fiber optic connectors. Furthermore, special tools are required to perform field installation for the existing fiber optic connectors. Finally, different models of fiber optic connectors are needed to connect different types and/or sizes of fiber optic cables.

Therefore, there is a need to provide improved fiber optic connectors that overcome the shortcomings in the existing fiber optic connectors with better performance for field installation.

SUMMARY

One embodiment of the disclosure relates to a fiber optic connector having a mechanical splice assembly and a mechanical splice assembly holder. The mechanical splice assembly holder includes a body section and a cable retention section. The cable retention section includes a pair of cable retention arms extending from the body section and a guiding groove that is extended out from the body section. The guiding groove is located between the two cable retention arms.

An additional embodiment of the disclosure relates to a method for making a cable assembly with a fiber optic connector like that described above. Thus, the method involves providing: a fiber optic cable having an optical fiber; a mechanical splice assembly; and a mechanical splice assembly holder. The mechanical splice assembly holder includes a body section and a cable retention section. The cable retention section includes a pair of cable retention arms extending from the body section and a guiding groove that is extended out from the body section. The guiding groove is located between the two cable retention arms. According to the method, the optical fiber is inserted into the mechanical splice assembly through the guiding groove. The method also involves securing the optical fiber of the fiber optic cable in the mechanical splice assembly.

Another embodiment of the disclosure relates to a fiber optic connector having a mechanical splice assembly, ferrule, and mechanical splice assembly holder. The mechanical splice assembly includes a mechanical splice assembly house having a first end, a second end, a tubular cavity through the first and second ends, and a lead-in tube at the second end. The lead-in tube includes a front opening. A first end of the ferrule is inserted into the mechanical splice assembly house from the first end of the mechanical splice assembly house. The mechanical splice assembly holder includes a body section having a tubular cavity and a cable retention section having a pair of cable retention arms extending from the body section. The cable retention section also includes a guiding groove that is extended out from the body section and located between the two cable retention arms. The second end of the mechanical splice assembly house is inserted to the tubular cavity of the body section of the mechanical splice assembly holder to align the front opening of the lead-in tube with the guiding groove.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of fiber optic connectors will appreciate how features and attributes associated with embodiments shown in one of the drawings may be applied to embodiments shown in others of the drawings.

FIG. 5D is an enlarged bottom perspective view of the mechanical splice assembly holder in FIG. 2 according to another explanatory embodiment;

FIGS. 6A-B and 7A-B are perspective and cross-section views showing the attachment of the splice assembly housing onto the mechanical splice assembly holder;

FIGS. 10A-C are perspective, elevation, and section views illustrating a clamp holder of FIG. 1 in greater detail;

DETAILED DESCRIPTION

Reference is now made to the embodiments, examples of which are illustrated in the accompanying drawings. In the detailed description of the embodiments, directional terminology, such as "top," "bottom," "front," "rear," "side," "left," "right," "forward," "trailing," etc., is used with reference to the orientation of the Figure(s) being described. Because components of embodiments of present invention can be positioned in a number of different orientations, the directional terminology is used for purposes of illustration and is in no way limiting. Whenever possible, the same or similar reference numbers and symbols are used throughout the drawings to refer to the same or similar parts.

Figure 1:
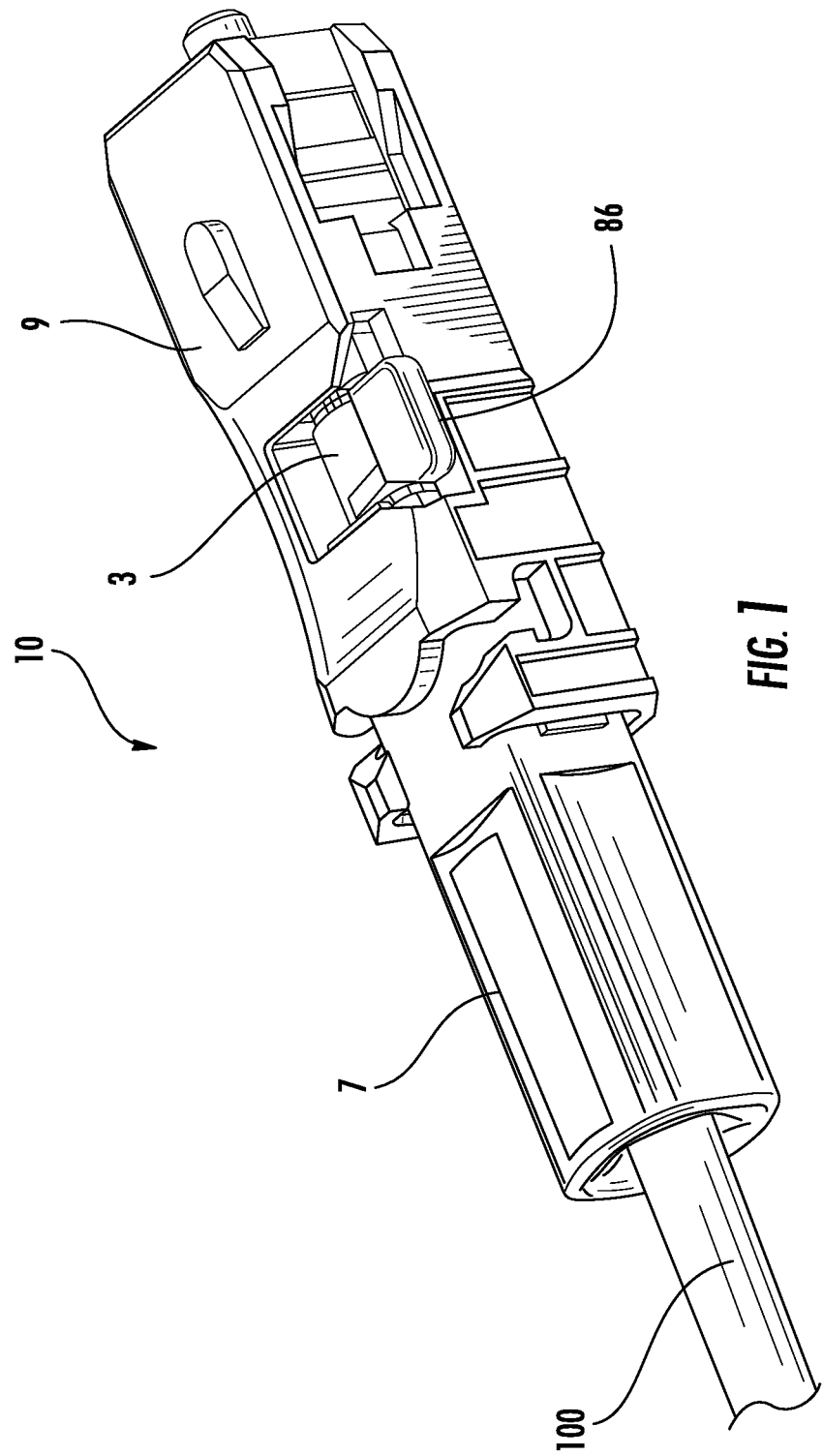
FIG. 1 is a perspective view of an exemplary cable assembly.
Figure 2:
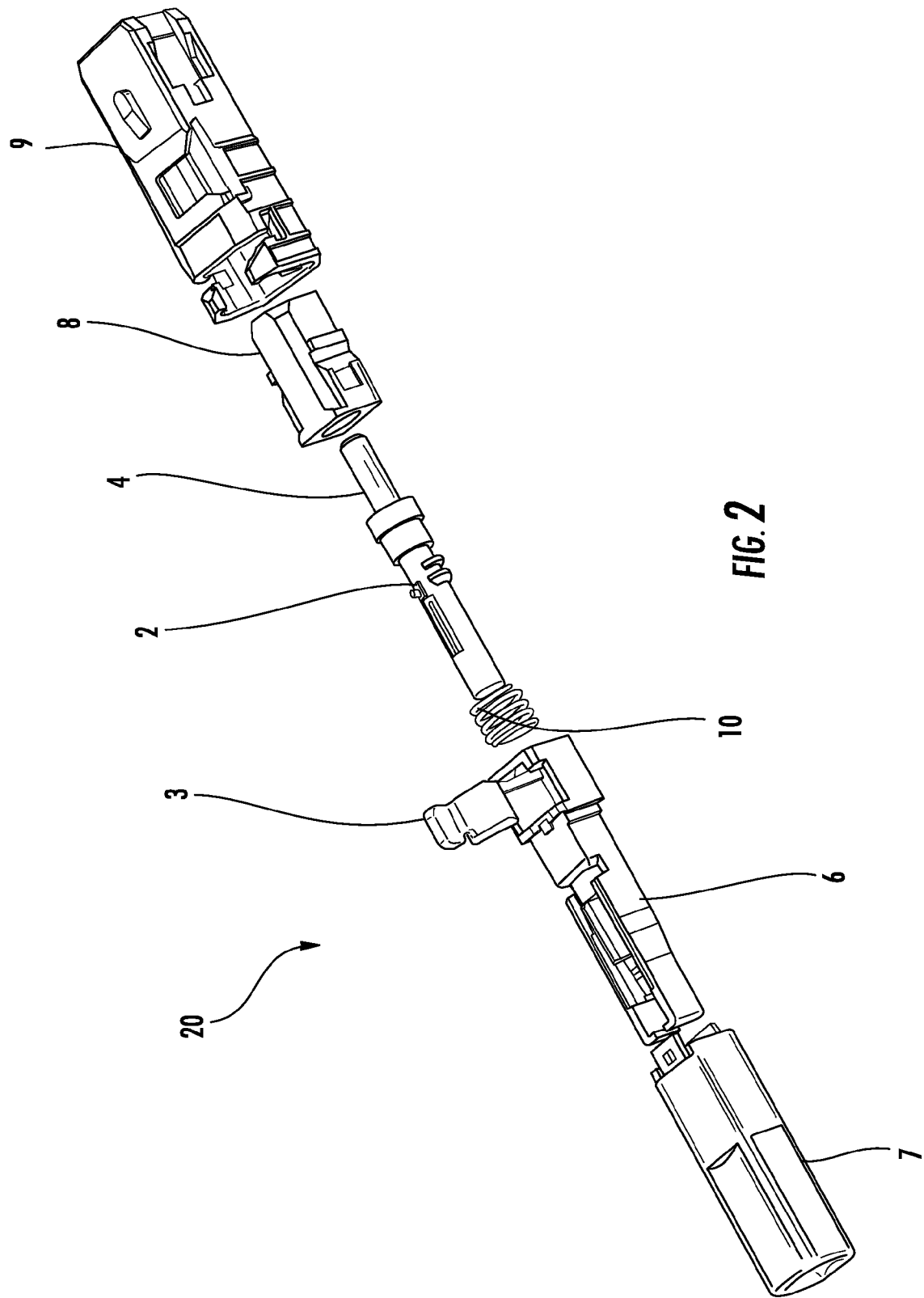
FIG. 2 is a partially exploded view of one embodiment of a fiber optic connector.

Referring to FIG. 1, there is shown a perspective view of an exemplary cable assembly 10 for explaining the concepts of the present disclosure. The cable assembly 10 has a fiber optic connector 20 as best shown in FIG. 2. As shown in FIG. 1, the cable assembly 10 comprises a cam 3, a clamp holder 7, and a shroud 9 that have been assembled as one unit to connect a fiber optic cable 100 onto the fiber optic connector 20.

Referring to FIG. 2, there is shown a partially exploded view of the fiber optic connector 20. As shown in FIG. 2, the fiber optic connector 20 comprises a mechanical splice assembly 2, the cam 3 for activating the mechanical splice assembly 2, a mechanical splice assembly holder 6 for accommodating and retaining a rear portion of the mechanical splice assembly 2, a clamp holder 7, a connector housing 8 for accommodating a front portion of the mechanical splice assembly 2, a spring 10 for biasing the mechanical splice assembly 2 along the forward direction, and the shroud 9.

Figure 3:
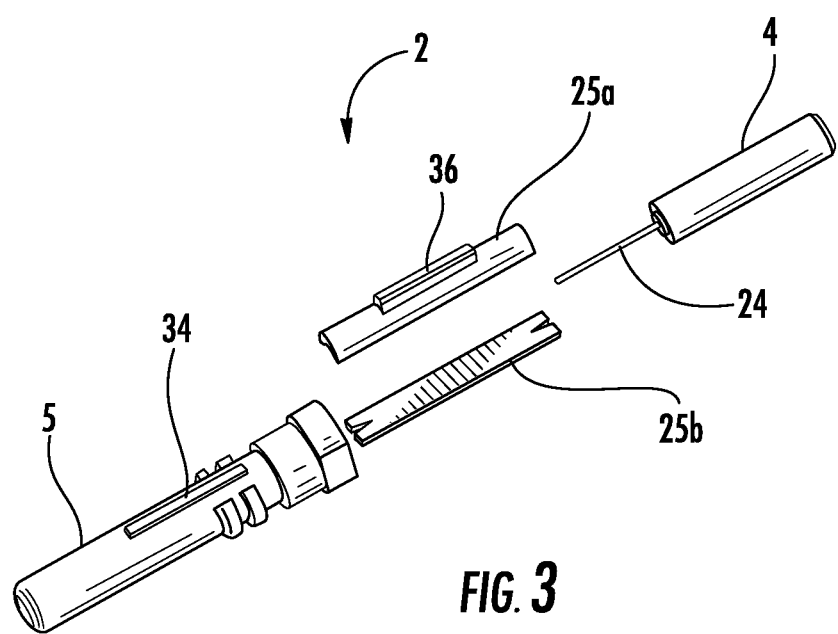
FIG. 3 depicts a mechanical splice assembly of FIG. 2 in greater detail.

FIG. 3 depicts the mechanical splice assembly 2 of FIG. 2 in greater detail. As shown in FIG. 3, the mechanical splice assembly 2 comprises a ferrule 4 having a stub optical fiber 24 extending out from its rear end, a splice assembly housing 5, and a pair of splice parts 25a and 25b. It should be noted other suitable mechanical splice assemblies can have fewer or more components than the embodiment shown. An endface of the ferrule 4 (with the stub optical fiber 24) is finished in the factory, thereby eliminating the finishing/polishing steps for the craft (an individual in the technical field of this disclosure). Likewise, the free end of the stub optical fiber 24 is prepared to the desired length in the factory using any suitable method such as laser processing or the like. Consequently, the craft can terminate the mechanical splice assembly 2 in the field by simply making a mechanical splice connection between the stub optical fiber 24 and an optical fiber 102 (see FIG. 16) in the fiber optic cable 100, thereby allowing a reliable connection between the optical fibers in the field.

When assembled, the mechanical splice assembly 2 in FIG. 3 has the pair of splice parts 25a and 25b inserted into the splice assembly housing 5 with the rear end of the ferrule 4 secured in the front end of the splice assembly housing 5. Further, the stub optical fiber 24 is disposed between the pair of splice parts 25a and 25b. Thus, an optical fiber in a cable may be inserted into the rear end of the splice assembly housing 5 and guided between the pair of splice parts 25a and 25b for abutting with the stub optical fiber 24. After the optical fibers are abutted, they can be held in place between the splice parts, thereby forming the mechanical splice between the optical fibers.

In the embodiment shown in FIG. 3, a keel 36 is provided on a top surface of the splice part 25a and an elongated window 34 is provided on an outside surface of the splice assembly housing 5. The splice assembly housing 5 and the pair of splice parts 25a and 25b are configured so that when the pair of splice parts 25a and 25b are disposed within splice assembly housing 5, the keel 36 extends through the elongated window 37. This enables the cam 3 to bias the splice parts 25a and 25b together to retain (or grip) the ferrule 4 and the fiber optic cable 100 between the splice parts 25a and 25b when the cam 3 is rotated to an activating position.

Figure 4A:
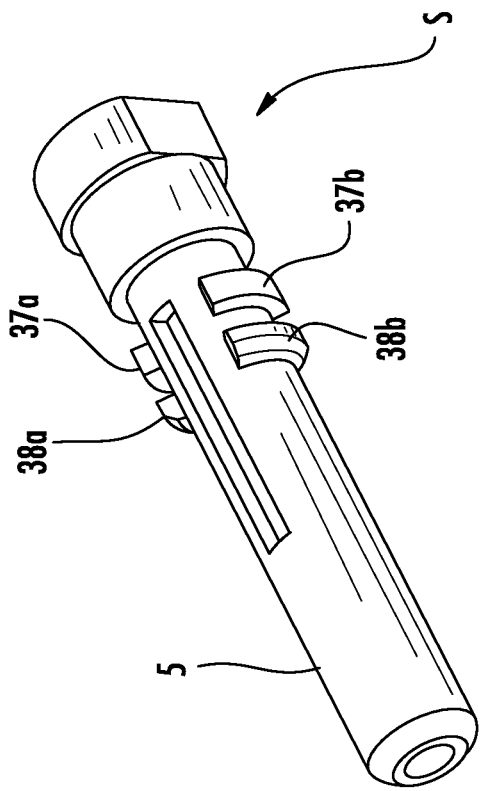
FIGS. 4A-C are various enlarged views of a splice assembly housing shown in FIG. 3.
Figure 4B:
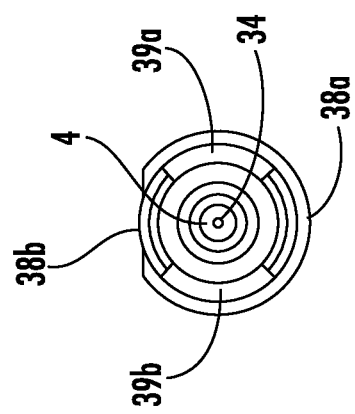
Figure 4C:
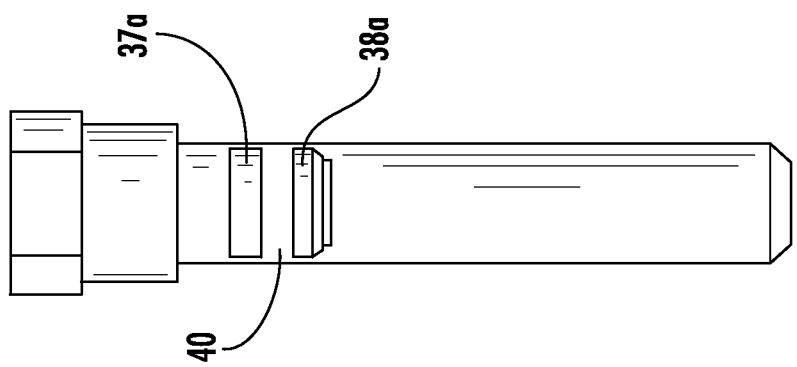

FIGS. 4A-C show various enlarged views of the splice assembly housing 5 shown in FIG. 3. As shown in FIG. 4A, the splice assembly housing 5 has a partially cylindrical-shape body having two pairs of fan-shaped protrusions 37a, 37b and 38a, 38b (serving as a first engagement means) on the outside surface of the splice assembly housing 5 for enabling the mechanical splice assembly holder 6 to retain the mechanical splice assembly 2 when the splice assembly housing 5 is inserted into the mechanical splice assembly holder 6. As shown in FIG. 4B (which is a rear view of FIG. 4A) and FIG. 4C (which is a side view of FIG. 4A from direction S), the two pairs of fan-shaped protrusions 37a, 37b and 38a, 38b are symmetrically configured around the outside surface of the cylindrical-shaped splice assembly housing 5, but non-symmetrical variations are possible according to the concepts disclosed herein. Consequently, adjacent to the fan-shaped pairs of protrusions 37a, 37b and 38a, 38b, a pair of fan-shaped concaves/cavities 39a and 39b is also symmetrically formed around the outside surface of the cylindrical-shaped splice assembly housing 5. As shown in FIG. 4C, the two pairs of protrusions 37a, 38a and 37b, 38b are arranged to form a rotational gap (rotational pass) 40 between the two pairs of protrusions 37a, 38a and 37b, 38b. According to one explanatory embodiment, the width of the rotational gap 40 is 2 millimeters (mm), but other dimensions are possible.

Figure 5A:
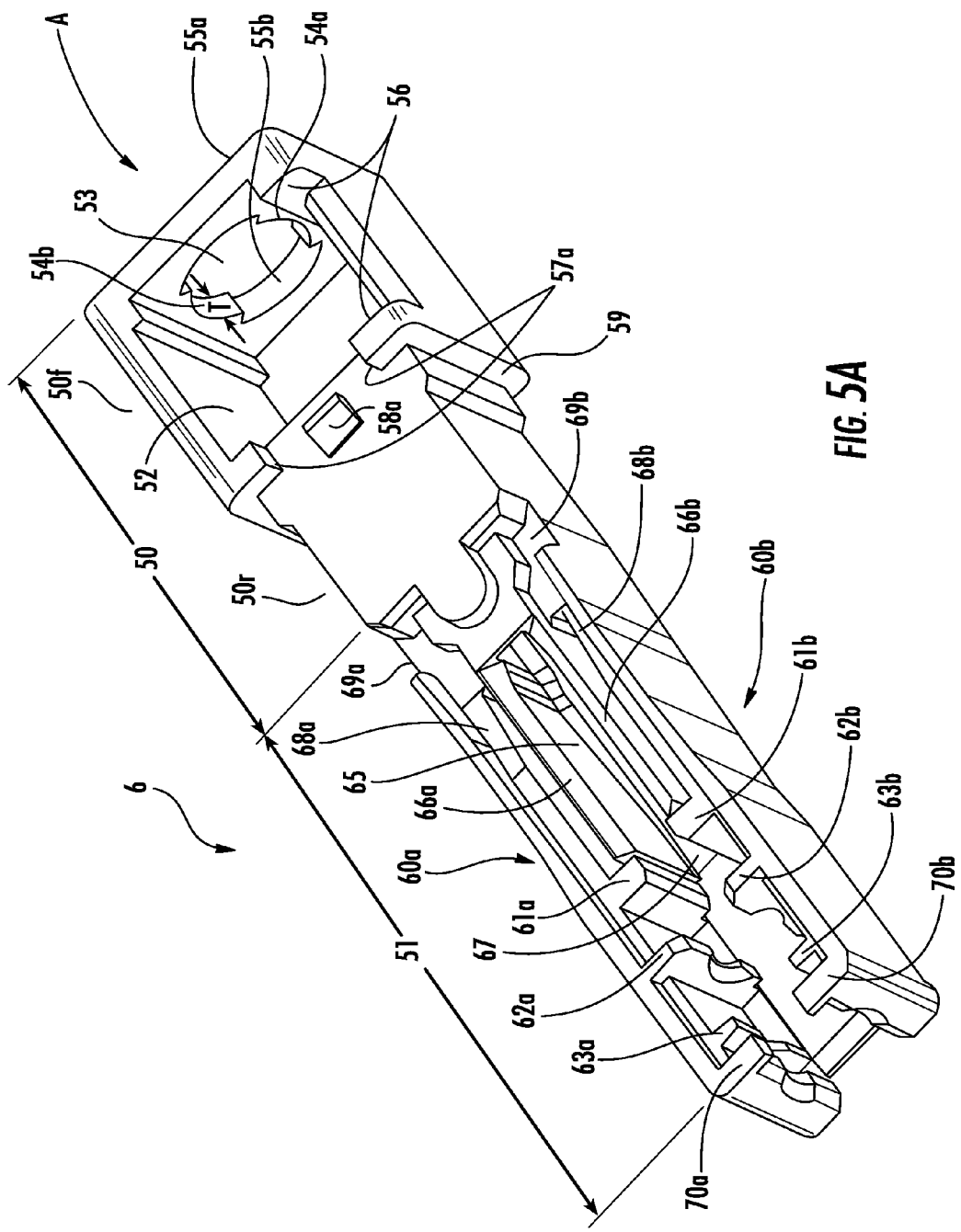
FIG. 5A is an enlarged top perspective view of a mechanical splice assembly holder in FIG. 2.

Referring to FIG. 5A, there is shown an enlarged top perspective view of the mechanical splice assembly holder 6 in FIG. 2. As shown in FIG. 5A, the mechanical splice assembly holder 6 comprises a body section 50 and a cable retention section 51. The body section 50 comprises a front portion 50*f* and a rear portion 50*r*. The front portion 50*f* comprises a cavity 52 for accommodating the cam 3 and the splice assembly housing 5. In its front portion, the cavity 52 comprises a front opening 53 for allowing the splice assembly housing 5 to be inserted into the body section 50. A pair of fan-shaped protrusions 54*a*, 54*b* (serving as a second engagement means) is symmetrically configured on the internal circumference of the opening 53, but non-symmetrical variations are possible according to the concepts disclosed herein.

Figure 5B:
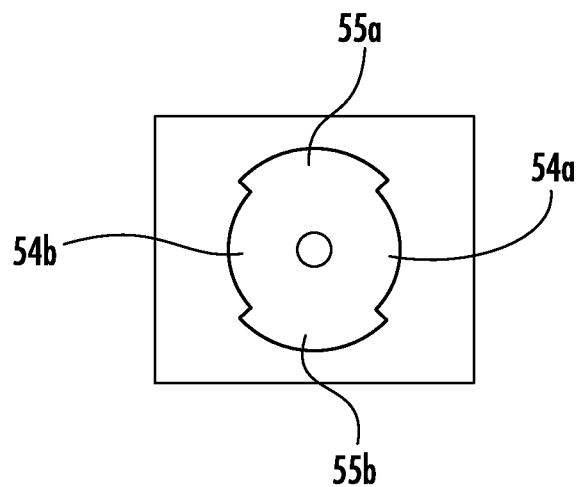
FIG. 5B is a front view of FIG. 5A.

Referring to FIG. 5B, which is a front view of FIG. 5A from direction A, there is shown a pair of fan-shaped concaves/cavities 55*a*, 55*b* that are symmetrically formed adjacent to the pair of fan-shaped protrusions 54*a*, 54*b* on the internal circumference of the opening 53. As shown, the profile of the pair of fan-shaped protrusions 54*a*, 54*b* and the pair of fan-shaped concaves 55*a*, 55*b* on the mechanical splice assembly holder 6 are inverse to (i.e., complementary with) the pair of fan-shaped concaves 39*a*, 39*b* and the two pairs of fan-shaped protrusions 37*a*, 37*b* and 38*a*, 38*b* on the splice assembly housing 5, respectively. Further, to retain the splice assembly housing 5, a thickness T on the wall of the pair of fan-shaped protrusions 54*a*, 54*b* matches the rotational gap 40 between the two fan-shaped pairs of protrusions 37*a*, 37*b* and 38*a*, 38*b* so that the pair of fan-shaped protrusions 54*a*, 54*b* on the mechanical splice assembly holder 6 can be slid into the rotational gap 40 on the splice assembly housing 5 for securing the same. Of course, other complimentary shapes and/or geometry may be used between the mechanical splice assembly holder 6 and splice assembly housing 5.

FIGS. 6A-B and 7A-B are illustrative views showing the attachment of the splice assembly housing 5 onto the mechanical splice assembly holder 6. As shown in FIGS. 6A and 6B, the splice assembly housing 5 is inserted into the body section 50 of the mechanical splice assembly holder 6 when the pairs of fan-shaped protrusions 37*a*, 37*b* and 38*a*, 38*b* on the splice assembly housing 5 are aligned with the pair of fan-shaped concaves 55*a*, 55*b* on the mechanical splice assembly holder 6.

As shown in FIGS. 7A-B, when the pair of fan-shaped protrusions 54*a*, 54*b* on the opening 53 is positioned about in the middle position of the rotational gap 40, the pair of fan-shaped protrusions 54*a*, 54*b* can be slid into the rotational gap 40 by rotating the splice assembly housing 5. When the pair of fan-shaped protrusions 54*a*, 54*b* is moved into the rotational gap 40 on the splice assembly housing 5, the splice assembly housing 5 is retained (or secured) onto the mechanical splice assembly holder 6 such as by rotation between the parts. Other suitable geometries are possible for mechanically securing the parts together.

Conventional mechanical splice fiber optic connectors have the splice assembly housing and mechanical splice assembly holder attached to each other by using adhesives. By providing two pairs of fan-shaped protrusions 37*a*, 37*b* and 38*a*, 38*b* on the splice assembly housing 5 and a pair of fan-shaped protrusions 54*a*, 54*b* on the mechanical splice assembly holder 6, the fiber optic connector 20 attaches the splice assembly housing 5 onto the mechanical splice assembly holder 6 without using adhesives. Comparing to the conventional mechanical splice fiber optic connectors, the fiber optic connectors disclosed can sustain wider ranges of off-axis swing movement and/or larger swing forces along its radial direction without breaking the mechanical splice assembly 2. This is so because when the pair of fan-shaped protrusions 54*a*, 54*b* is retained in the rotational gap 40 between the fan-shaped protrusions 37*a*, 37*b* and 38*a*, 38*b*, the splice assembly housing 5 is still able to move in radial direction some degree relative to the mechanical splice assembly holder 6. With such an advantage, the fiber optic connector disclosed is more robust in field installation and durable in use.

Referring back to FIG. 5A, as one explanatory embodiment, the body section 50 and cable retention section 51 of the mechanical splice assembly holder 6 are manufactured as one piece (i.e., a monolithic construction) in which the cable retention section 51 is extended out from the body section 50. Because the cross-section of the front portion 50*f* is larger than that of the rear portion 50*r*, a shoulder 59 is formed in the joint place between the front portion 50*f* and the rear portion 50*r* on the body section 50. The shoulder 59 is used to stop the clamp holder 7 when the mechanical splice assembly holder 6 is inserted into the clamp holder 7, but other configurations are possible. Of course non-monolithic construction is also possible. However, the monolithic construction of the body section 50 and cable retention section 51 enables the fiber optic connectors to have some advantages, such as a more compact size, an easy manufacture, an easy assembly, a more robust in field installation, and the like.

Figure 5C:
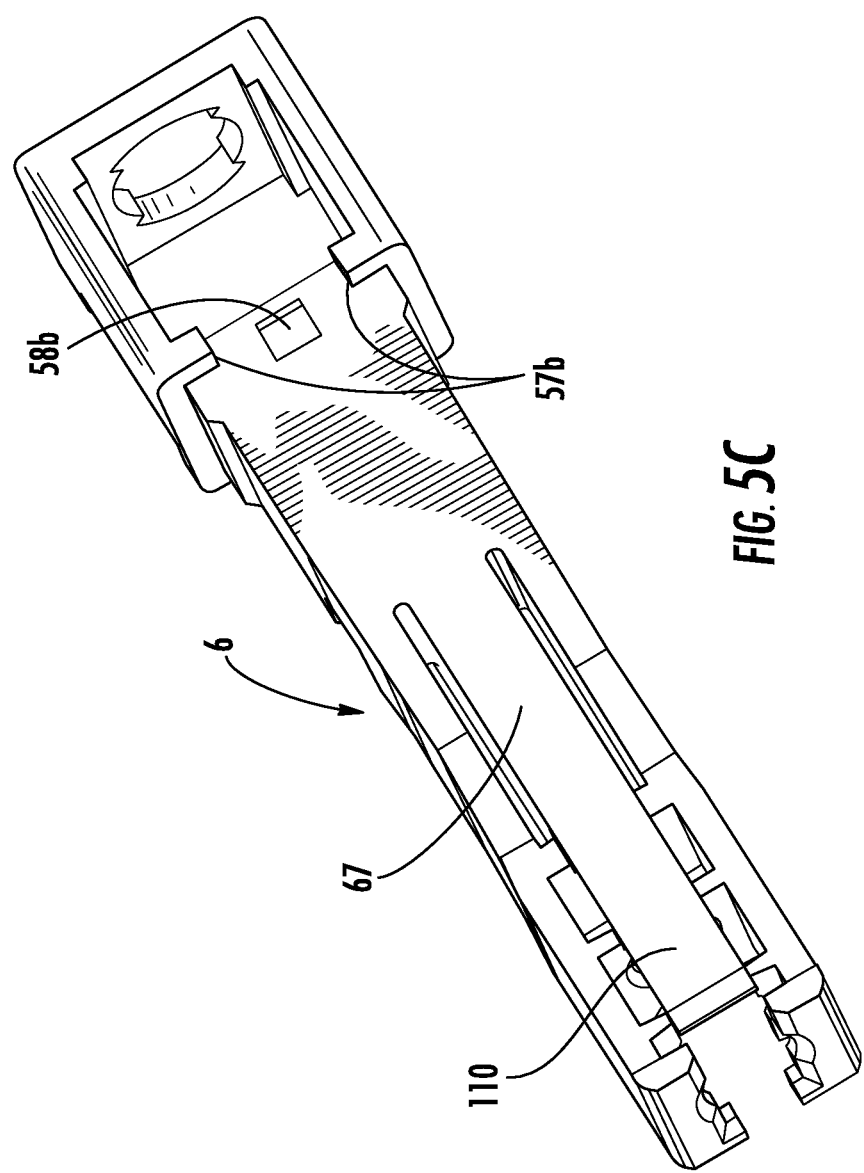
FIG. 5C is an enlarged bottom perspective view of the mechanical splice assembly holder in FIG. 2 according to one explanatory embodiment.

As shown in FIG. 5A, the cavity 52 of the mechanical splice assembly holder 6 may further comprises a side notch 56 for accommodating the cam handle 86 (see FIGS. 13A-C) if used on the cam 3 when the cam 3 is rotated into an activated position (see FIG. 1). An opening 57*a* is provided on the shoulder 59, and a latch 58*a* is provided in the front of or between the opening 57*a* on the top surface of the rear portion 50*r*. Symmetrically, an opening 57*b* is provided on the shoulder 59 and a latch 58*b* is provided in a position in the front of or between the opening 57*b* on the bottom surface of the rear portion 50*r*, as shown in FIGS. 5C-D (which are enlarged bottom perspective views of the mechanical splice assembly holder 6 in FIG. 2). The two openings 57*a* and 57*b* are used to receive the latch ears 72*a* and 72*b* on the clamp holder 7 as shown in FIG. 10A. To better secure the clamp holder 7, each of the two latches 58*a*, 58*b* has an ascending slope. It should be appreciated by a person in the field, other structures are possible for securing the clamp holder 7 with the mechanical splice assembly holder 6, such as latches on the clamp holder 7 and openings or windows on the mechanical splice assembly holder 6.

Figure 8A:
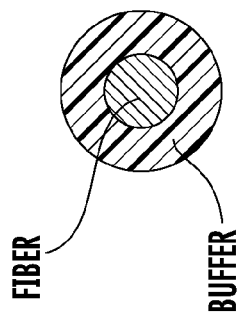
FIGS. 8A-C are cross-sectional views of three types of fiber optic cables.
Figure 8C:
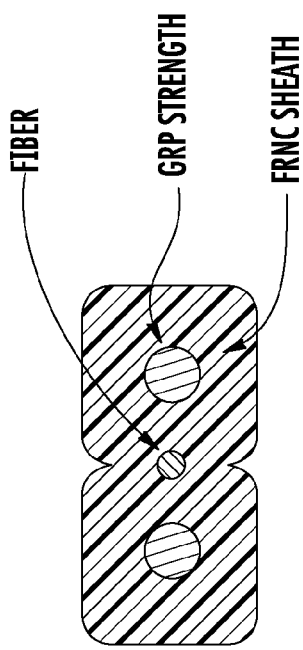
Figure 8B:
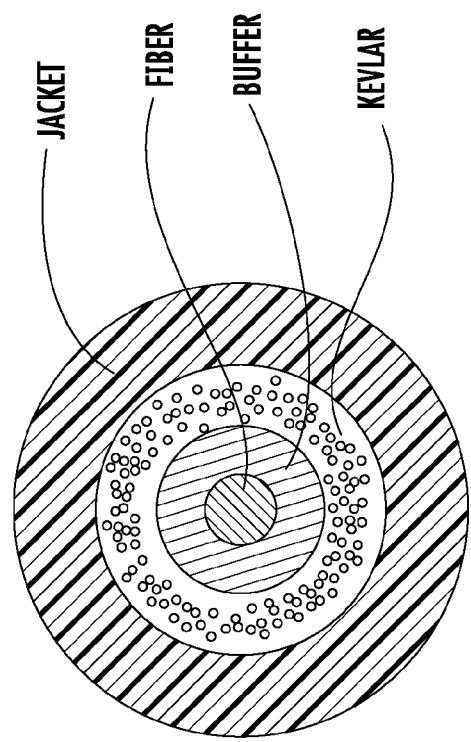

Referring still to FIG. 5A, the cable retention section 51 on the mechanical splice assembly holder 6 comprises a pair of clamp arms 60*a* and 60*b* having at least two sets of clamping points for different sizes and/or types of optic fiber cables. In other words, the mechanical splice assembly holder 6 can accommodate several different cables for providing termination flexibility for the craft. In the explanatory embodiment shown, the pair of clamp arms 60*a* and 60*b* has three sets of clamping points for three different types of fiber cables as shown in FIGS. 8A-C. Moreover, the concept of clamping arms having at least two sets of clamping points for different sizes and/or types of fiber optic cables is independent of other features of the connector shown and may be used with any suitable splice fiber optic connectors.

Referring to FIGS. 8A-C, there are shown three explanatory types of fiber optic cables, including 0.9 mm round cable (i.e., buffered fiber) without a cable jacket; 3.0 mm round jacket cable with a cable jacket and aramid yarn such as Kevlar®; and 2.0×3.0 mm flat-shaped (or bow-shaped) cable.

As shown in FIG. 8A, the 0.9 mm round cable comprises an optical fiber with a 0.9 mm buffer layer around it. Because the diameter of the 0.9 mm round cable without a cable jacket is rather small, the pair of clamp arms 60*a* and 60*b* provides a first set of clamping points 61*a* and 61*b* having a pair of flat surfaces (as best shown in FIG. 5A) to grip the 0.9 mm round cable.

As shown in FIG. 8B, the 3.0 mm round jacket cable comprises an optical fiber, a buffer layer wrapped around the buffer layer, a strength member (such as Kevlar® or strength yarns) layer disposed around the optical fiber, and a jacket layer around the strength member layer. Because the diameter of the 3.0 mm round jacket cable is larger than that of the 0.9 mm round cable, the pair of clamp arms 60*a* and 60*b* provides a second set of clamping points 62*a* and 62*b* having a pair of larger half-round surfaces to form a larger round-enclosure (shown in FIG. 5A) for securing the 3.0 mm round jacket cable.

The connectors disclosed herein are also suitable for terminating rugged cable designs having rigid strength members, thereby making the cable suitable for outdoor applications. As shown in FIG. 8C, the 2.0×3.0 mm flat cable comprises an optical fiber, a pair of glass-reinforced plastic (GRP) strength members that are positioned at two sides of the optical fiber and a generally flat-shaped flame retardant non corrosive (FRNC) sheath around the optical fiber and pair of GRP strengths. According to one embodiment, a third set of the clamping points 63*a* and 63*b* (shown in FIG. 5) is provided for securing the 2.0×3.0 mm flat cable. More specifically, as shown in FIG. 5A, a pair of arms 70*a* and 70*b* are provided on the top edge on the third set clamping points 63*a* and 63*b* to form a flat-shaped contour which is suitable for securing the flat cable.

It should be appreciated to a person in the field that, in the disclosure, the clamping diameters or widths of the three sets of clamping points are arranged in an increasing order towards the tip (or distal end) along the two clamp arms 60*a* and 60*b* so that a pair of clamping points for a type of optical fiber cable will not negatively impact another pair of clamping points for a different type of optical fiber cable. It should also be appreciated that the principle and spirit of the present invention also apply to a structure where the clamp arms 60*a* and 60*b* have a different number of sets of clamping points (e.g., one or two sets, or more than three sets).

It should be also appreciated to a person in the field the feature of having multiple clamping points in present invention may also apply to other types and/or sizes of fiber optic cables in addition to the cables shown in FIGS. 8A-C, such as 1.9/1.6 mm jacket round cable and 2.9/2.4 mm jacket round cable.

Referring back again to FIG. 5A, the cable retention section 51 comprises a groove 65 for guiding the optical fiber within an optical fiber cable into the splice assembly housing 5. As shown in FIG. 5A, the groove 65 extends out from the body section 50 of the mechanical splice assembly holder 6 and comprises a pair of groove side-walls 66*a* and 66*b* and a groove bottom 67 (see FIGS. 6A-B and 9A-B).

Referring to FIGS. 6A-B and FIGS. 9A-B, there is shown the groove 65 of FIG. 5A in greater detail. As shown in FIG. 6B, which is the cross sectional view of FIG. 6A along line B-B, the splice assembly housing 5 has a lead-in tube 98 at its rear end. The groove 65 on the mechanical splice assembly holder 6 is aligned with the opening of the lead-in tube 98 on the splice assembly housing 5 when the splice assembly housing 5 is installed within the mechanical splice assembly holder 6.

Figure 9A:
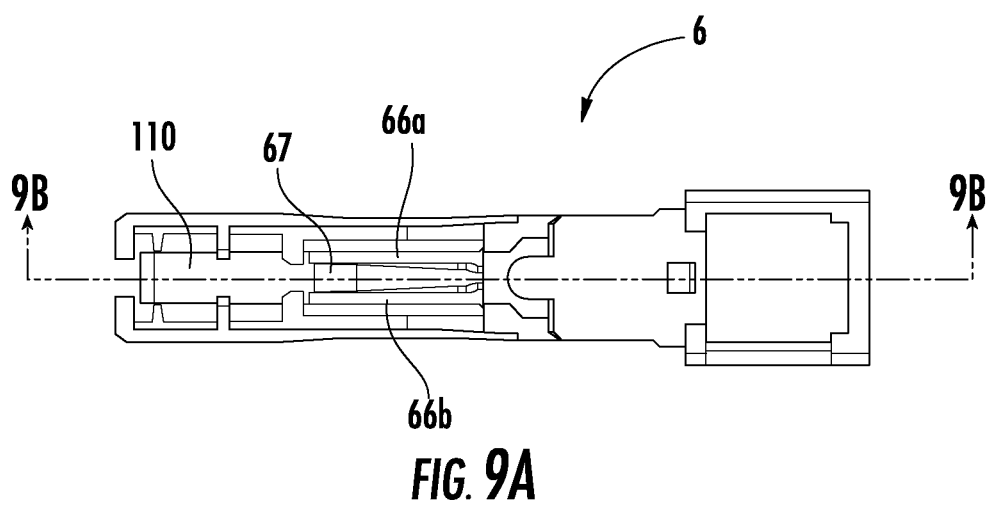
FIGS. 9A-B elevation and sectional views illustrating a groove of FIG. 5A in greater detail.
Figure 9B:
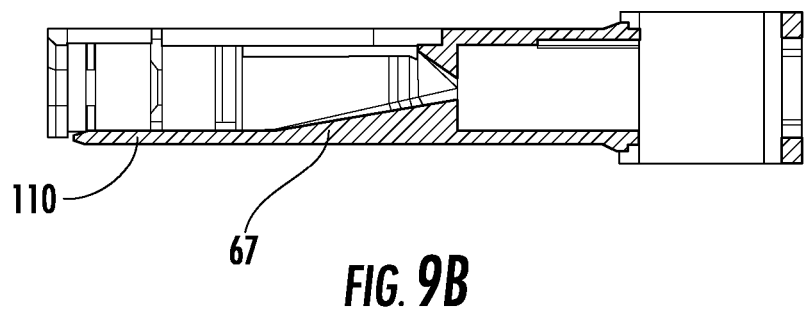

FIG. 9A is a top view of the mechanical splice assembly holder 6 of FIG. 5A showing that the two groove side-walls 66*a* and 66*b* are configured as a funnel-shaped channel between the internal sides of the groove walls 66*a* and 66*b* towards the opening of the lead-in tube 98. As best shown in FIG. 9B, which is the cross-sectional view of FIG. 9A along line 9B-9B, the top surface of the groove bottom 67 gradually rises towards the opening of the lead-in tube 98. Therefore, under the guidance of the two groove side-walls 66*a* and 66*b* and the groove bottom 67, the optical fiber in an optical fiber cable can be easily guided into the opening of the lead-in tube 98 in the splice assembly housing 5 after the optical fiber enters the groove 65. In addition, as shown in FIG. 6B, each of the groove side-walls 66*a* and 66*b* is separated from its corresponding clamp arm 60*a* or 60*b* to form a peninsular-shaped groove 65. The peninsular-shaped groove 65 will not negatively impact the moving flexibility of the two clamp arms 60*a* and 60*b* towards each other. Such moving flexibility enhances the effectiveness to clamp a fiber optic cable.

FIG. 5C depicts an enlarged bottom perspective view of the mechanical splice assembly holder 6 in FIG. 2 according to one explanatory embodiment of the present invention. As shown in FIG. 5C, an opening 57*b* is provided on the shoulder 59 and a latch 58*b* is provided in a position in front of or between the opening 57*b* on the bottom surface of the mechanical splice assembly holder 6. To better guide the optical fiber on a fiber optic cable, a tongue 110 extends out from the groove bottom 67 towards (or to reach) the tip of the cable retention arms 60*a*, 60*b*.

FIG. 5D depicts an enlarged bottom perspective view of the mechanical splice assembly holder 6 in FIG. 2 according to another explanatory embodiment of the present invention. As shown in FIG. 5D, a tongue 110' extends out from the groove bottom 67 towards (or to reach) the tip of the cable retention arms 60*a*, 60*b*. Comparing with the embodiment in FIG. 5C, the tongue 110' is narrower than the groove bottom 67. Because the tongue 110 (or 110') is separated from the clamp arms 60*a* or 60*b*, it will not negatively impact the moving flexibility of the two clamp arms 60*a* and 60*b* towards each other.

Referring back to FIG. 5A, two strength member grooves 68*a* and 68*b* are respectively provided on the top surfaces of the two clamp arms 60*a* and 60*b* for receiving and accommodating a strength member (e.g., Kevlar® or yarn). Two strength member notches 69*a* and 69*b* are configured on the side-wall of the two clamp arms 60*a* and 60*b* to respectively connect the two strength member grooves 68*a* and 68*b* so that when an optical fiber cable is inserted between the two clamp arms 60*a* and 60*b*, the strength member of the optical fiber cable can pass along the grooves 68*a* or 68*b* and extend to outside of the grooves 68*a* or 68*b* through the strength member notches 69*a* or 69*b*.

FIGS. 10A-C show the clamp holder 7 of FIG. 1 in greater detail. As shown in FIG. 10A, the clamp holder 7 comprises two front edges 74*a*, 74*b* and two latch ears 72*a* and 72*b*. The two front edges 74*a*, 74*b* and two latch ears 72*a*, 72*b* are provided symmetrically opposite to each other around the body of the clamp holder 7. Two latch mechanisms 73*a* and 73*b* such as opening or window are provided on the latch ears 72*a* and 72*b*, respectively, for securing the clamp holder 7.

Referring to FIG. 10B, there is shown the side view of the clamp holder 7 in FIG. 10A. As shown in FIG. 10B, the two latch ears 72*a* and 72*b* on the clamp holder 7 extend out exceeding the edges of two front edges 74*a* and 74*b*.

Referring to FIG. 10C, there is shown a cross sectional view of FIG. 10B along the direction 10C-10C. As shown in FIG. 10C, the clamp holder 7 comprises a cavity 75 having a passageway with a gradually reduced dimension, which is used to squeeze the clamp arms 60a and 60b together when the cable retention section 51 on the mechanical splice assembly holder 6 is inserted into the cavity 75 of the clamp holder 7. The cavity 75 is configured so that a fiber optic cable is loosely disposed between the two clamp arms 60a and 60b when they enter into the passageway of the cavity. As the two clamp arms 60a and 60b gradually move deeper into the passageway, the cavity 73 gradually decreases, thereby squeezing the two clamp arms 60a and 60b together to grip the fiber optic cable therebetween. The movement stops when the front edges 74a, 74b of the clamp holder 7 meet the shoulder 59 on the mechanical splice assembly holder 6.

Figure 11A:
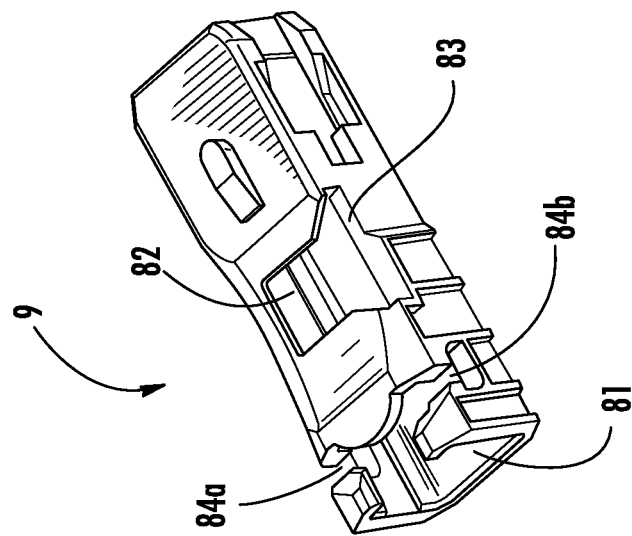
FIGS. 11A-B are perspective views of a shroud of FIG. 2 in greater detail.
Figure 11B:
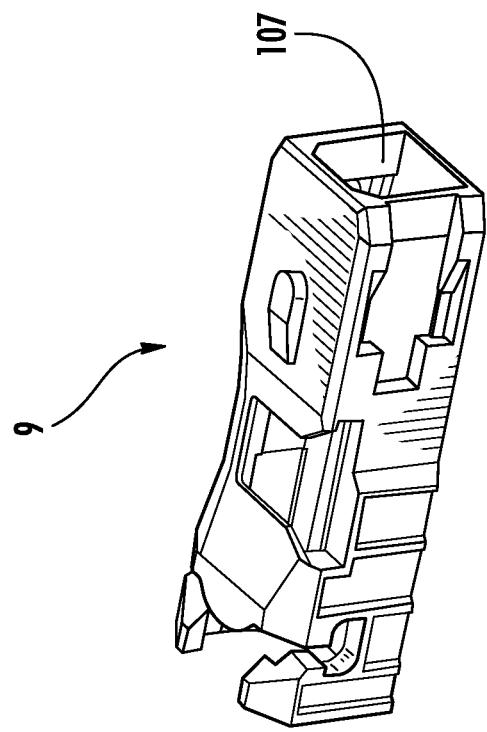

Referring to FIGS. 11A-B, there is shown two perspective views of the shroud 9 of FIG. 2 in greater detail. As shown in FIG. 11A, the shroud 9 comprises an opening 81 at its rear end for receiving the connector housing 8; a U-shaped window 82 for accommodating the cam 3; and a sliding slot 83 located at the open edge of the U-shaped window 82 so that a cam handle 86 (as shown in FIG. 13) can slide back and forth along the sliding slot 83 when the cam 3 is placed in the locking position. The shroud 9 further comprises two strength member notches 84a and 84b that can be aligned with the two strength member notches 69a and 69b on the mechanical splice assembly holder 6.

Figure 12A:
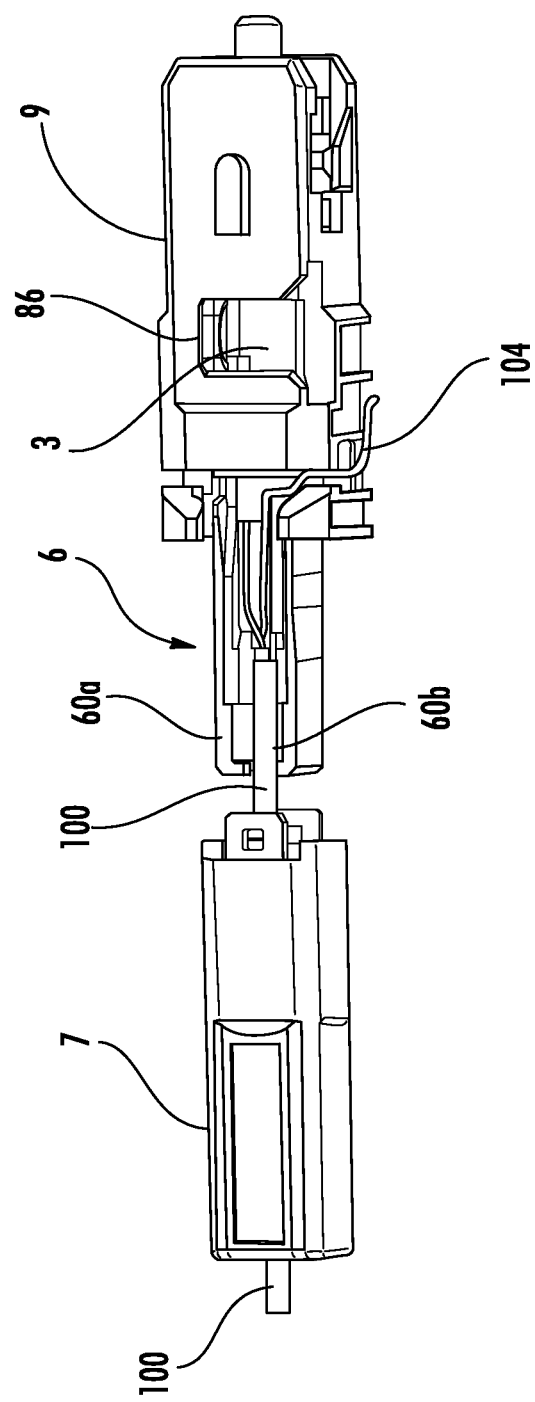
FIG. 12A is a perspective view illustrating steps for attaching a strength member onto the fiber optic connector of FIG. 2.

FIG. 12A illustrates steps for attaching the strength member 104 onto the fiber optic connector 20 in installation operation. As shown in FIG. 12A, prior to installing the strength member 104 onto the fiber optic connector 20, the rear end of the mechanical splice assembly 2 is inserted into the mechanical splice assembly holder 6 and the front end of the mechanical splice assembly 2 is inserted into the connector housing 8 (FIG. 2), which is in turn inserted into the shroud 9. After being inserted into the two clamp arms 60a and 60b through the passageway of the cavity 75 on the clamp holder 7, the strength member 104 enters into one of the grooves 68a or 68b and passes through one of the two strength member notches 69a and 69b on the two clamp arms 60a and 60b. The strength member 104 further passes through one of the two strength member notches 84a or 84b on the shroud 9 to reach a side wall of the shroud 9. The two clamp arms 60a and 60b are then moved into the passageway of the cavity 75 on the clamp holder 7 so that the one of the two edges 74a and 74b on the clamp holder 7 pushes the strength member 104 into the shroud 9 between the internal wall of the cavity 75 on the clamp holder 7 and the outside surface on the mechanical splice assembly holder 6. Therefore, after the fiber optic connector 20 is installed, the strength member 104 is griped between the internal wall of the cavity 75 on the clamp holder 7 and the outside surfaces on the rear portion 50r of the body section 50 of the mechanical splice assembly holder 6.

Figure 12B:
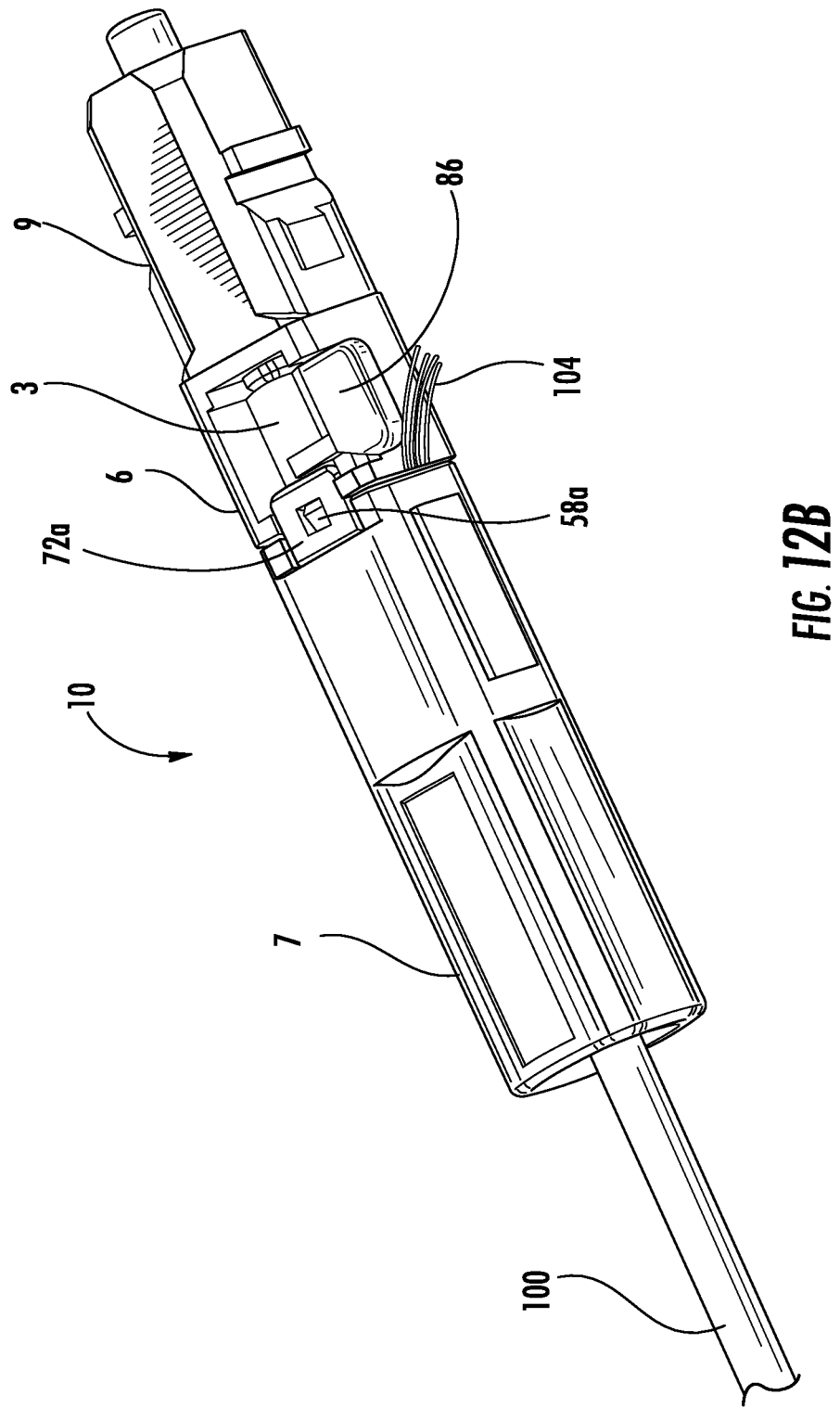
FIG. 12B is a perspective view of the cable assembly of FIG. 1 without a shroud.

FIG. 12B depicts a cable assembly 10 without the shroud 9. As shown in FIG. 12B, after all other components (except the shroud 9) are assembled together, the head of the strength member 104 extends out of the clamp holder 7. When the fiber optic cable 100 is released from the mechanical splice assembly holder 6 in a deactivating process, the strength member 104 can be easily and conveniently pulled out of the two strength member notches 69a or 69b on the mechanical splice assembly holder 6.

It should be appreciated, after the fiber optic cable 100 is attached to the fiber optic connector 20 in installation, the strength member 104 of the fiber optic cable 100 is kept outside of the shroud 9 as shown in FIG. 1. Such an arrangement enables a craft to easily observe whether the fiber optic cable 100 and the strength member 104 are properly installed and helps him/her by holding the strength member 104 when attaching the fiber optic cable 100 onto the fiber optic connector 20, or when releasing the fiber optic cable 100 from and re-attaching the fiber optic cable 100 onto the fiber optic connector 20.

It should be also appreciated that the present disclosure provides a mechanism for a craft to conveniently secure the strength member 104 onto the fiber optic connector 20 in an activating or re-activating operation, but to conveniently release it from the fiber optic connector 20 in a deactivating operation without damaging the strength member 104.

Figure 13C:
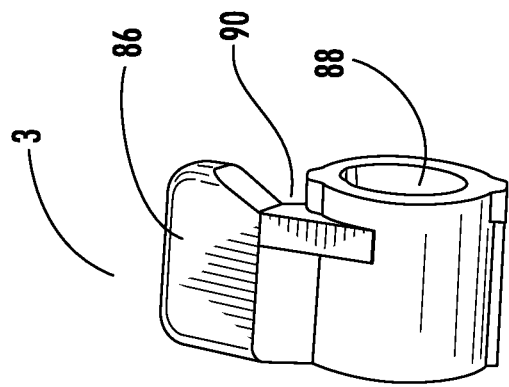
FIGS. 13A-C are perspective views and a side view of the cam in FIG. 2.
Figure 13B:
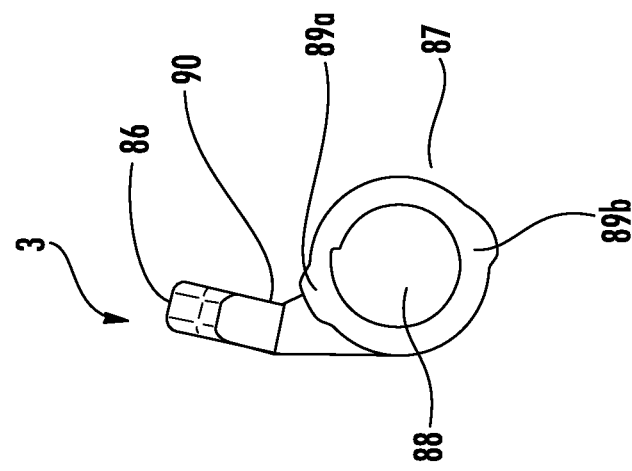
Figure 13A:
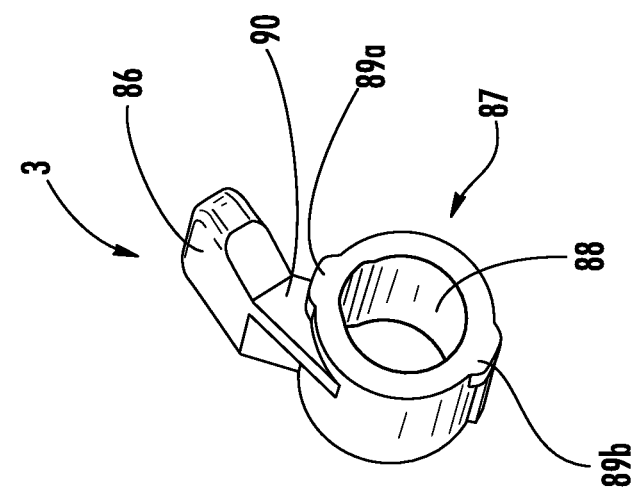

Referring to FIGS. 13A-C, there are shown two perspective views and a side view of the cam 3 in FIG. 2, respectively. As shown in FIGS. 13A-C, the cam 3 comprises a handle 86 and a body 87. The cam handle 86 has a notch 90 for receiving the latch ears 72a on the clamp holder 7 when the mechanical splice assembly holder 6 is inserted into the clamp holder 7. The cam body 87 further comprises a through hole 88 with an eccentric circumference for receiving and accommodating the splice assembly housing 5 and a pair of symmetrically arranged protrusions 89a and 89b for lifting the two latch ears 72a and 72b on the clamp holder 7. To properly lift the latch ear 72a on the clamp holder 7, the protrusion 89a is provided below or adjacent to the notch 90 on the cam handle 86 so that when the mechanical splice assembly holder 6 is inserted into the clamp holder 7, the latch ear 72a on the clamp holder 7 is placed over the protrusion 89a on the cam 3 when the cam 3 is in the releasing position. In installation, to mount the cam 3 onto the mechanical splice assembly housing 5, the mechanical splice assembly housing 5 is inserted into the through hole 88 on the cam 3. When the cam 3 is in a released position, the splice assembly housing 5 is loosely placed within the through hole 88. But when the cam 3 is rotated into the locked position, the eccentric portion on the through hole 88 is pressed against the keel 36 on the top surface of the splice part 25a so that the pair of splice parts 25a and 25b can grip the optic fiber 102 in the fiber optic cable 100 and the stub optical fiber 24 therebetween.

Figure 14:
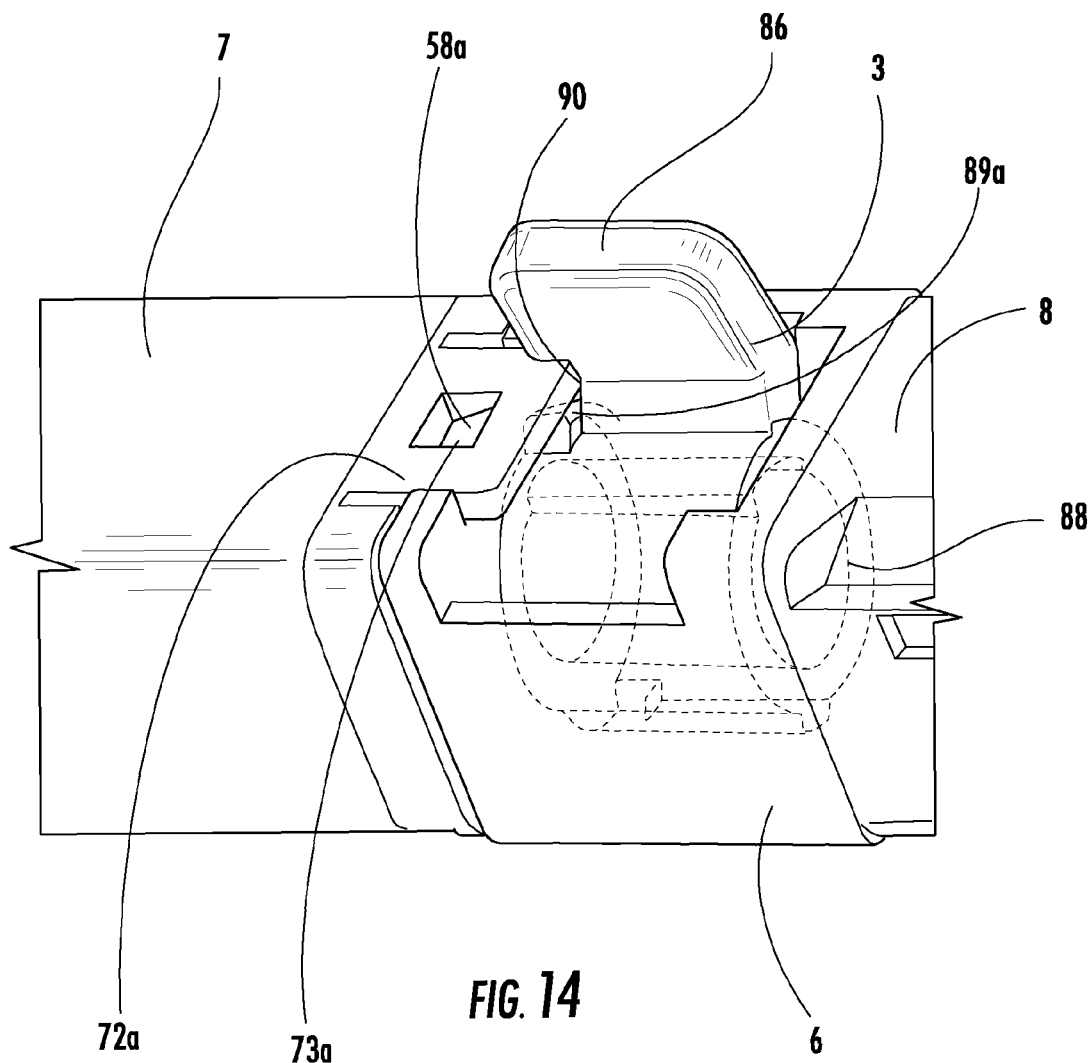
FIG. 14 is a perspective view illustrating how to assemble the cam, mechanical splice assembly holder, clamp holder, and connector housing together.

Referring to FIG. 14, there is shown a perspective view to illustrate how to assemble the cam 3, mechanical splice assembly holder 6, clamp holder 7, and connector housing 8 together when the cam 3 is in a releasing position. As shown in FIG. 14, because the latch ear 72a on the clamp holder 7 is inserted through the opening 57a on the mechanical splice assembly holder 6 and the left edge of the latch ear 72a is inserted into the notch 90 on the cam handle 86, the latch mechanism 73a on the latch ear 72a is aligned with the latch 58a on the mechanical splice assembly holder 6. However, because the latch ear 72a on the clamp holder 7 is placed on the protrusion 89a on the cam 3, the latch mechanism 73a on the latch ear 72a is lifted above the latch 58a on the mechanical splice assembly holder 6, thus preventing the latch 58a from being snapped/clipped into the latch mechanism 73a. Due to the symmetrical arrangement, the latch ear 72b on the clamp holder 7 is also inserted through the opening 57b on the mechanical splice assembly holder 6, causing the latch mechanism 73b on the latch ear 72b aligned with the latch 58b on the mechanical splice assembly holder 6. However, because the latch ear 72b on the clamp holder 7 is placed on the protrusion 89b on the cam 3, the latch mechanism 73b on the latch ear 72b is lifted above the latch 58b on the mechanical splice assembly holder 6, thus preventing the latch 58b from being snapped/clipped into the latch hole 73b. Therefore, in FIG. 14, the cam 3 is in the releasing position where the mechanical splice assembly holder 6 can be freely pushed into or pulled out from the clamp holder 7.

In an activating operation, when the cam 3 is rotated from the releasing position as shown in FIG. 14 to the locking position as shown FIG. 12B, the latches 58a and 58b on the mechanical splice assembly holder 6 are snapped/clipped into the latch mechanisms 73a and 73b on the clamp holder 7, thus attaching the mechanical splice assembly holder 6 onto the clamp holder 7. More specifically, when the cam handle 86 is being rotated cross over the latch ear 72a from its left edge to its right edge, the two protrusions 89a and 89b on the cam body 87 are being moved away from the latch ears 72a and 72b on the clamp holder 7. When the cam handle 86 reaches the sliding slot 83 on the shroud 9, the two protrusions 89a and 89b on the cam body 87 are moved out from the latch ears 72a and 72b on the clamp holder 7. Consequently, the two latches 58a and 58b on the mechanical splice assembly holder 6 snap/clip into the two latch mechanisms 73a and 73b on the clamp holder 7, thus attaching the mechanical splice assembly holder 6 onto the clamp holder 7.

In a deactivating operation, when the cam 3 is being rotated from the locking position to the releasing position, the two latch mechanisms 73a and 73b on the clamp holder 7 are lifted from the two latches 58a and 58b on the mechanical splice assembly holder 6, thus releasing the mechanical splice assembly holder 6 from the clamp holder 7. More specifically, when the cam handle 86 is being rotated cross over the latch ear 72a from its right edge to its left edge, the two protrusions 89a and 89b on the cam body 87 are being moved towards the latch ears 72a and 72b on the clamp holder 7. When the cam handle 86 reaches the left edge of the latch ear 72a, the two protrusions 89a and 89b on the cam body 87 are moved under the latch ears 72a and 72b on the clamp holder 7. Consequently, the two latch mechanisms 73a and 73b on the clamp holder 7 are lifted away from the two latches 58a and 58b on the mechanical splice assembly holder 6, thus releasing the mechanical splice assembly holder 6 from the clamp holder 7.

It should be appreciated the fiber optic connector 20 disclosed provides activation/deactivation mechanism that is easy to operate without requiring any tools and without damaging any components in activating/deactivating operation. It should also be appreciated the fiber optic cable that is connected to fiber optic connector 20 can sustain lager pulling force if a craft inadvertently pulls the clamp holder 7 because the pulling force is sustained (or most of the pulling force is sustained) by the two latches 58a and 58b on the mechanical splice assembly holder 6 and the two latch ears 72a and 72b on the clamp holder 7, not by the fiber optic cable to be connected. Consequently, the fiber optic connector 20 is reversible without damaging or destroying the same while still providing a robust connector solution. It should also be appreciated the strength member of a fiber optic cable will not be damaged in a deactivation/activation reverse procedure.

Figure 15C:
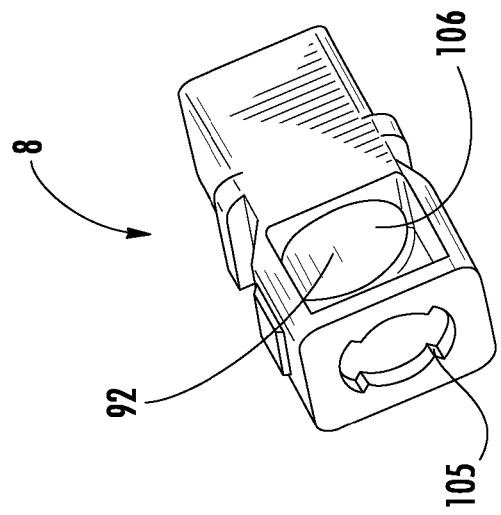
FIGS. 15A-C are perspective views of a connector housing shown in FIG. 2.
Figure 15B:
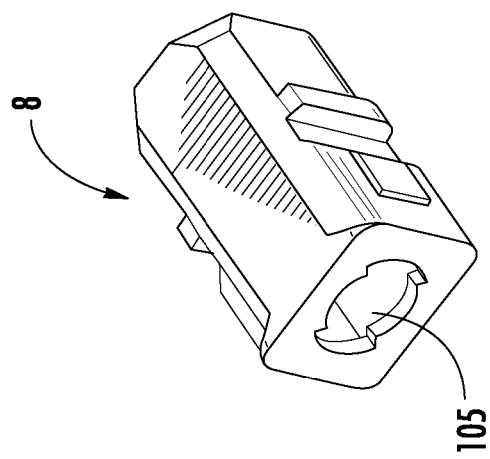
Figure 15A:
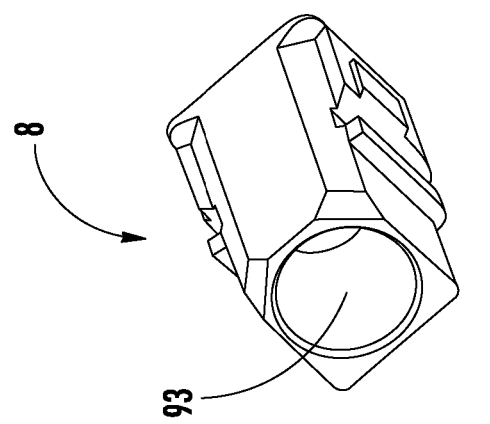

FIGS. 15A-C depict three perspective views of the connector housing 8 shown in FIG. 2. As shown in FIG. 15A, which is the top perspective view of the connector housing 8 from its front end, the connector housing 8 comprises a front opening 93 for receiving an adapter (not shown) in field installation. FIG. 15B depicts the top perspective view of the connector housing 8 from its rear end, showing a rear opening 105 for receiving the rear end of the ferrule 4 (see FIG. 3). As shown in FIG. 15C, which is the bottom perspective view of the connector housing 8 from its rear end, the connector housing 8 comprises a cavity 92 (having a middle opening 106) for receiving and accommodating the spring 10. As shown in FIGS. 15B-C, on the bottom of the connector housing 8, the rear opening 105, and the middle opening 106 are provided on two ends of the cavity 92. Because the splice assembly housing 5 needs fitly passing through the rear opening 105, the internal circumference of the rear opening 105 on the connector housing 8 has the same geometry with that of the front opening 53 on the mechanical splice assembly holder 6 (see FIG. 5), by 90 degree rotation. In other words, the internal circumference of the rear opening 105 on the connector housing 8 overlaps with that of the front opening 53 on the mechanical splice assembly holder 6 if the rear opening 105 on the connector housing 8 is rotated 90 degree relative to the front opening 53 on the mechanical splice assembly holder 6. It should be appreciated, with the identical geometry by 90 degree rotation, the rear opening 105 on the connector housing 8 and the front opening 53 on the mechanical splice assembly holder 6 can effectuate with the two pairs of fan-shaped protrusions (37a, 37b and 38a, 38b) on the splice assembly housing 5 at two different times when the splice assembly housing 5 is placed in two different rotational positions. Such a structure enables the rear opening 105 on the connector housing 8 to stop the rotational movement of the splice assembly housing 5 after the splice assembly housing 5 is retained onto the mechanical splice assembly holder 6 and the fiber optic connector 20 is assembled.

Figure 16:
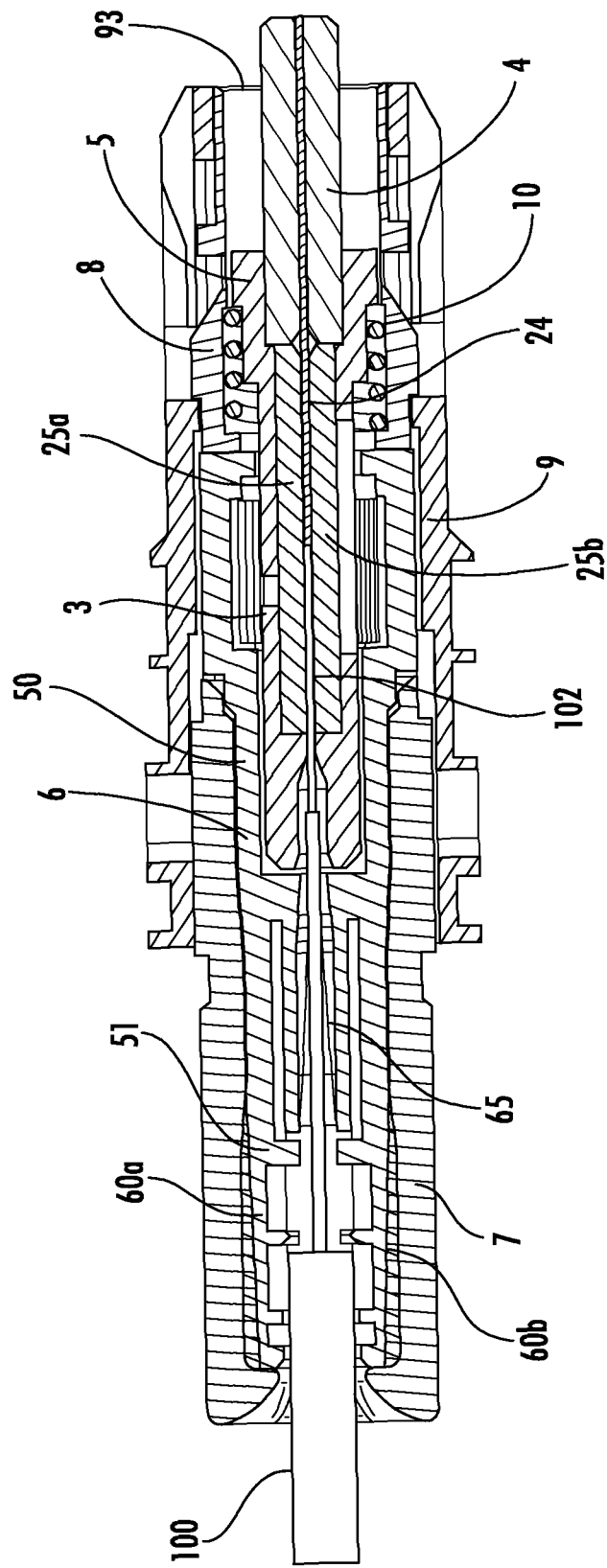
FIG. 16 is a cross-sectional view of the fiber optic cable assembly in FIG. 1.

Referring to FIG. 16, there is shown a cross-sectional view of the fiber optic cable assembly 10 in FIG. 1. As shown in FIG. 16, the optic fiber cable 100 is inserted into and gripped by the cable retention section 51 on the mechanical splice assembly holder 6, while the stub optical fiber 24 is inserted between and gripped by the splice parts 25a and 25b. The optical fiber 102 on the optic fiber cable 100 is inserted into the splice parts 25a and 25b under the guidance of the groove 65, where the optical fiber 102 is abutted with the stub optical fiber 24 and retained between the splice parts 25a and 25b. The splice assembly housing 5 is inserted into and retained by the body section 50 on the mechanical splice assembly holder 6, while the cam 3 is mounted on the splice assembly housing 5. After the spring 10 is placed within the connector housing 8, the end portion of the mechanical splice assembly 2 is inserted into the same such that the spring 10 is mounted on the end portion of the splice assembly housing 5. After the optical fiber 102 on the fiber optic cable 100 is placed within the splice parts 25a and 25b, the cable retention section 51 on the mechanical splice assembly holder 6 is inserted into the clamp holder 7 to squeeze the two arms on the cable retention section 51 together. As shown in FIG. 16, the shroud 9 is used to house the body section 50 on the mechanical splice assembly holder 6, the mechanical splice assembly 2, the connector housing 8 and the spring 10. As shown in FIG. 11B, the opening 107 on the shroud 9 is used to receive an adapter (not shown) in field installation. As shown in FIG. 16, the connector housing 8 provides connecting function according to the SC standard and the spring 10 provides a biased force between the splice assembly housing 5 and the connector housing 8.

In reference to the figures, a craftsperson ("the craft"; an individual in the technical field of this disclosure) can perform the connector assembly operation by the illustrative steps as described below.

The craft first inserts the two splice parts 25a and 25b into the splice assembly housing 5 and inserts the stub optical fiber 24 on the ferrule 4 between the two splice parts 25a and 25b as shown in FIG. 3. The craft then puts the spring 10 into the cavity 92 on the connector housing 8 as shown in FIG. 15C. Next, the craft inserts the connector housing 8 and the mechanical splice assembly holder 6 successively into the shroud 9 through its rear opening 81 in a position where the cavity 52 on the mechanical splice assembly holder 6 is aligned with the window 82 on the shroud 9 as shown in FIG. 5A and FIG. 11A. The craft thereafter puts the cam 3 in its releasing position into the cavity 52 on the mechanical splice assembly holder 6 through the window 82 on the shroud 9.

After appropriately aligning the two pairs of fan-shaped protrusions (37*a*, 37*b* and 38*a*, 38*b*) on the splice assembly housing 5 with the rear opening 105 on the connector housing 8 (see FIG. 15B), the craft further inserts the rear end of the splice assembly housing 5 into the front opening 93 on the connector housing 8, which passes through the spring 10 and the rear opening 105 on the connector housing 8 as shown in FIG. 15B and separates the connector housing 8 apart from the splice assembly housing 5 about 2 mm gap. The craft then rotates the splice assembly housing 5 by 90 degrees by counter-clockwise so as to appropriately align the two pairs of fan-shaped protrusions (37*a*, 37*b* and 38*a*, 38*b*) with the front opening 53 on the mechanical splice assembly holder 6 (see FIG. 5A), and then continuously inserts the splice assembly housing passing through the front opening 53 on the mechanical splice assembly holder 6 as shown in FIG. 5A.

The craft finally rotates the splice assembly housing 90 degrees by clockwise to move the protrusions 54*a* and 54*b* on the mechanical splice assembly holder 6 into the rotational gap 40 on the splice assembly housing 5 so that the splice assembly housing 5 is retained onto the mechanical splice assembly holder 6.

In reference to the figures, the craft can perform the field cable termination operation using the connector of the present disclosure by the illustrative steps described below.

The craft inserts the fiber optic cable 100 through the passageway 75 on the clamp holder 7, pushing the optic fiber 102 on the fiber optic cable 100 into the guide groove 65 on the mechanical splice assembly holder 6 and further into the lead-in tube 98 on the splice assembly housing 5. The craft may then put Kevlar® or yarn into the two strength member grooves 68*a* and 68*b* through one of the two strength member notches 69*a* and 69*b* on the mechanical splice assembly holder 6 and further through one of the two strength member notches 84*a* and 84*b* on the shroud 9. Eventually the craft inserts the mechanical splice assembly holder 6 into the clamp holder 7 so that the fiber optic cable 100 is gripped by one set of the three sets of clamping points. Finally, the craft rotates the cam 3 from the relapsing position into the locking position so that the mechanical splice assembly holder 6 is attached onto the clamp holder 7 and the optic fiber 102 on the fiber optic cable 100 and the stub optical fiber 24 on the ferrule 4 are griped between the two splice parts 25*a* and 25*b*.

Figure 17:
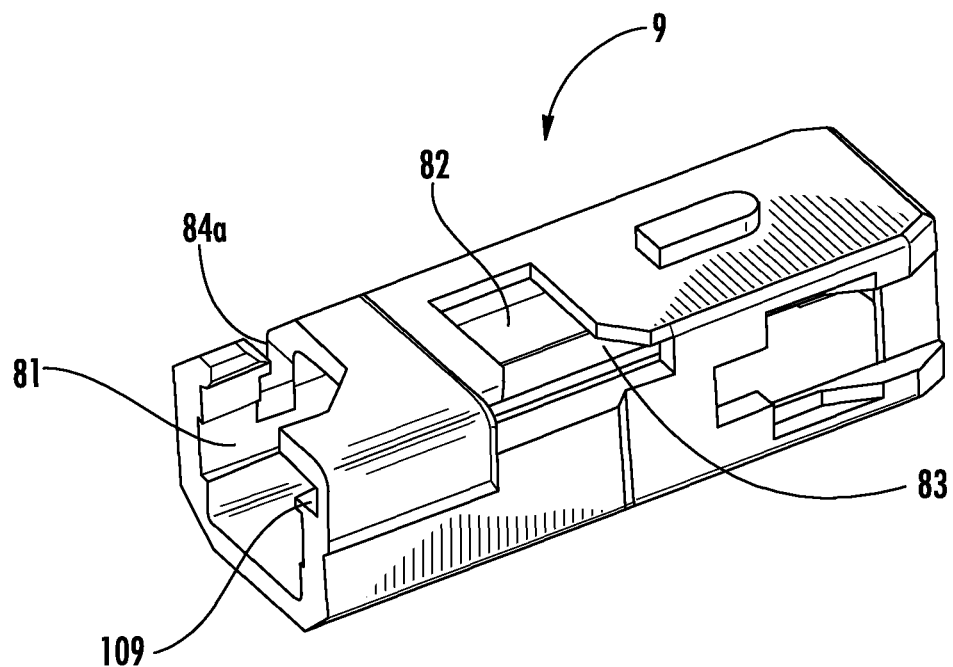
FIG. 17 is a perspective view of an alternative embodiment a shroud for the fiber optic connector of FIG. 2.

Referring to FIG. 17, there is shown an alternative embodiment for the shroud 9. As shown in FIG. 17, the shroud 9 comprises a groove 109 which is provided on the up right corner of and extends through the whole body of the shroud 9 so that the handle 86 on the cam 3 is aligned with the groove 9 when the cam 3 is in the locking position. In installation, after all other components (except the shroud 9) in the cable assembly 10 are assembled together (as shown in FIG. 12B), the cable assembly 10 can be then inserted into the shroud 9 because the groove 109 allows the handle 86 on cam 3 to go through the shroud 9 to a predetermined position within the shroud 9, thus making field installation easier. When the cam 3 reaches the window 82 on the shroud 9, it can be rotated between the locking position and releasing position.

To facilitate assembly and maintenance, some or all of the components for the fiber optic connector 20 can be made using translucent materials. By way of example, the cam 3 and/or some or all of the splice parts may be translucent.

It should be appreciated the structure disclosed can provide more compact design for fiber optic connectors. In particular, the structure disclosed can reduce the length of the existing fiber optic connectors from 52 mm to 45 mm, even to 37 mm if a fiber optic connector is designed only for one type of round cable, at least for three reasons: (1) the splice assembly housing 5 is inserted into and retained within the mechanical splice assembly holder 6, (2) the cam 3 is disposed within the cavity 52 on the mechanical splice assembly holder 6 and mounted over the splice assembly housing 5, and (3) the mechanical splice assembly holder 6 is inserted into the clamp holder 7. In other words, these components overlap along longitudinal direction of the fiber optic connector which makes the fiber optic connectors of the present disclosure more compact comparing with the existing fiber optic connectors.

It should be noted that the fiber optic connector described herein contains at least five advantageous features, including: mounting a mechanical splice assembly onto the splice assembly holder without using adhesives; proving a cable connector with an optic fiber guiding mechanism; providing a cable connector with a strength member strain relief mechanism; proving a cable retention mechanism for different types of fiber optical cables; and providing a cable connector having a cam mechanism without using special tools in field installation. It should be appreciated that the descriptions and figures in this disclosure are illustrative to explain the principle for a person skilled in the art to practice the invention. Therefore, any one of these five features is generic to/independent from each other.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A fiber optic connector, comprising:
   a mechanical splice assembly including a mechanical splice assembly housing having a first end, a second end, and a tubular cavity through the first and second ends, the mechanical splice assembly also including a ferrule having a first end and a second end, wherein the first end of the ferrule is inserted into the mechanical splice assembly housing from the first end of the mechanical splice assembly housing;
   a mechanical splice assembly holder accommodating and retaining a rear portion of the mechanical splice assembly housing, the mechanical splice assembly holder having a body section and a cable retention section, the cable retention section including a pair of cable retention arms extending from the body section and a guiding groove that is extended out from the body section, wherein the guiding groove is located between the two cable retention arms;
   a connector housing receiving and accommodating a front portion of the mechanical splice assembly housing; and
   a spring placed within the connector housing and mounted on an end portion of the mechanical splice assembly housing, wherein the spring provides a biasing force between the mechanical splice assembly housing and the connector housing.

2. The fiber optic connector of claim 1, wherein the mechanical splice assembly housing comprises a lead-in tube at the second end of the mechanical splice assembly housing, the lead-in tube having a front opening.

3. The fiber optic connector of claim 2, wherein the body section of the mechanical splice assembly holder comprises a through tubular cavity, and further wherein the second end of the mechanical splice assembly housing is inserted to the tubular cavity of the body section on the mechanical splice assembly holder to align the front opening of the lead-in tube on the mechanical splice assembly housing with the guiding groove on the mechanical splice assembly holder.

4. The fiber optic connector of claim 3, wherein the guiding groove comprises two groove side-walls and a groove bottom, and further wherein the two groove side-walls are separated from the two cable retention arms.

5. The fiber optic connector of claim 4, wherein the guiding groove extends a portion of the length of the two cable retention arms.

6. The fiber optic connector of claim 5, wherein the guiding groove comprises a tongue that extends towards the tip of the cable retention arms.

7. The fiber optic connector of claim 4, wherein the body section and the cable retention section of the mechanical splice assembly holder are manufactured as one piece.

8. The fiber optic connector of claim 4, wherein the groove bottom includes a gradually raised surface towards the front opening of the lead-in tube to facilitate inserting an optic fiber in an optic fiber cable to the front opening of the lead-in tube.

9. The fiber optic connector of claim 8, wherein the two groove side-walls forms a funnel-shaped passageway towards the front opening of the lead-in tube to facilitate inserting an optic fiber in an optic fiber cable to the front opening of the lead-in tube.

10. The fiber optic connector of claim 9, wherein the front opening of the lead-in tube is funnel-shaped.

11. The fiber optic connector of claim 4, wherein the ferrule has a stub optical fiber extending out from the first end of the ferrule, and further wherein the fiber optic connector is used to connect an optic fiber cable having an exposed optical fiber that is inserted through the lead-in tube under the guidance of the guiding groove to meet the stub optical fiber.

12. The fiber optic connector of claim 4, further comprising:
a clamp holder for receiving and accommodating the cable retention section on the mechanical splice assembly holder when the optic fiber cable is inserted into the cable retention section.

13. The fiber optic connector of claim 12, further comprising:
a shroud for receiving and accommodating the connector housing, the mechanical splice assembly holder, and the clamp holder.

14. The fiber optic connector of claim 13, further comprising:
a cam means for activating and deactivating the mechanical splice assembly.

15. The fiber optic connector of claim 14, wherein the cam comprises a handle and the shroud comprises a groove for receiving the handle on the cam means.

16. A method for making a cable assembly, comprising steps of:
providing a fiber optic cable having an optical fiber;
providing a mechanical splice assembly that includes a mechanical splice assembly housing having a first end, and a second end, and a tubular cavity through the first and second ends, the mechanical splice assembly also including a ferrule having a first end and a second end, wherein the first end of the ferrule is inserted into the mechanical splice assembly housing from the first end of the mechanical splice assembly housing;
providing a mechanical splice assembly holder having a body section and a cable retention section, the cable retention section including a pair of cable retention arms extending from the body section and a guiding groove that is extended out from the body section, wherein the guiding groove is located between the two cable retention arms;
inserting a front portion of the mechanical splice assembly housing into a connector housing, wherein a spring is places within the connector housing and mounting on the front portion of the mechanical splice assembly housing, and further wherein the spring provides a biasing force between the mechanical splice assembly housing and the connector housing;
accommodating and retaining a rear portion of the mechanical splice assembly housing in the mechanical splice assembly holder;
inserting the optical fiber into the mechanical splice assembly through the guiding groove; and
securing the optical fiber of the fiber optic cable in the mechanical splice assembly.

17. The method of claim 16, wherein the mechanical splice assembly housing comprises a lead-in tube at the second end of the mechanical splice assembly housing and the lead-in tube has a front opening.

18. The method of claim 17, wherein the body section of the mechanical splice assembly holder comprises a through tubular cavity, and further wherein the second end of the mechanical splice assembly housing is inserted to the tubular cavity of the body section on the mechanical splice assembly holder to align the front opening of the lead-in tube on the mechanical splice assembly housing with the guiding groove on the mechanical splice assembly holder.

19. The method of claim 18, wherein the guiding groove comprises two groove side-walls and a groove bottom, and further wherein the two groove side-walls are separated from the two cable retention arms.

20. The method of claim 19, wherein the guiding groove extends a portion of the length of the two cable retention arms, and further wherein the guiding groove comprises a tongue that extends towards the tip of the cable retention arms.

21. The method of claim 19, wherein the groove bottom includes a gradually raised surface towards the front opening of the lead-in tube to facilitate inserting the optical fiber in to the front opening of the lead-in tube.

22. The method of claim 19, wherein the ferrule has a stub optical fiber extending out from the first end of the ferrule, and further wherein the fiber optic connector is used to connect an optic fiber cable having an exposed optical fiber that is inserted through the lead-in tube under the guidance of the guiding groove to meet the stub optical fiber.

23. The method of claim 19, further comprising a step of:
providing a clamp holder for receiving and accommodating the cable retention section on the mechanical splice assembly holder when the optic fiber cable is inserted into the cable retention section.

24. A fiber optic connector, comprising:
a mechanical splice assembly having a mechanical splice assembly housing with a first end, a second end, a tubular cavity through the first and second ends, and a lead-in tube at the second end, wherein the lead-in tube has a front opening;
a ferrule having a first end and a second end, wherein the first end of the ferrule is inserted into the mechanical splice assembly housing from the first end of the mechanical splice assembly housing; and
a mechanical splice assembly holder including a body section and a cable retention section, the body section including a tubular cavity, and the cable retention section including a pair of cable retention arms extending from the body section and a guiding groove that is extended out from the body section and located between the two cable retention arms, wherein the second end of the mechanical splice assembly housing is inserted to the tubular cavity of the body section of the mechanical splice assembly holder to align the front opening of the lead-in tube with the guiding groove, and wherein the mechanical splice assembly holder accommodates and retains a rear portion of the mechanical splice assembly housing;

a cam for activating the mechanical splice assembly, the cam being disposed within a cavity on the body section of the mechanical splice assembly holder and mounted over the mechanical splice assembly housing;

a connector housing receiving and accommodating a front portion of the mechanical splice assembly housing; and a spring placed within the connector housing and mounted on an end portion of the mechanical splice assembly housing, wherein the spring provides a biasing force between the mechanical splice assembly housing and the connector housing.

25. The fiber optic connector of claim 24, wherein the guiding groove comprises two groove side-walls and a groove bottom, and further wherein the two groove side-walls are separated from the two cable retention arms.

26. A fiber optic connector, comprising:
a mechanical splice assembly having a mechanical splice assembly housing having a first end, a second end, a tubular cavity through the first and second ends;
a ferrule having a first end and a second end, wherein the first end of the ferrule is inserted into the mechanical splice assembly housing from the first end of the mechanical splice assembly housing; and
a mechanical splice assembly holder having a body section and a cable retention section manufactured as one piece so as to have a monolithic construction, the mechanical splice assembly housing being inserted into the body section of the mechanical splice assembly holder, and the cable retention section including a pair of cable retention arms extending from the body section and a guiding groove that is extended out from the body section, wherein the guiding groove is located between the two cable retention arms, and wherein the mechanical splice assembly holder accommodates and retains a rear portion of the mechanical splice assembly housing;

a connector housing receiving and accommodating a front portion of the mechanical splice assembly housing; and a spring placed within the connector housing and mounted on an end portion of the mechanical splice assembly housing, wherein the spring provides a biasing force between the mechanical splice assembly housing and the connector housing.

27. The fiber optic connector of claim 1, wherein a rear opening on the connector housing and a front opening on the mechanical splice assembly holder have the same geometry but are rotationally positioned 90 degrees relative to each other.

28. The fiber optic connector of claim 24, wherein the cam comprises a cam body having a through hole with an eccentric circumference, the cam being mounted on the mechanical splice assembly housing through the through hole.

29. The fiber optic connector of claim 28, wherein the cam further comprises a handle, the fiber optic connector further comprising:
a shroud for receiving and accommodating the connector housing and the mechanical splice assembly holder, the shroud including a groove for receiving the handle on the cam.

* * * * *